(12) United States Patent
Collins

(10) Patent No.: US 7,356,577 B2
(45) Date of Patent: *Apr. 8, 2008

(54) SYSTEM AND METHOD FOR PROVIDING AN ONLINE SOFTWARE UPGRADE IN LOAD SHARING SERVERS

(75) Inventor: David Allan Collins, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 870 days.

This patent is subject to a terminal disclaimer.

(21) Appl. No.: 10/459,748

(22) Filed: Jun. 12, 2003

(65) Prior Publication Data

US 2004/0253956 A1 Dec. 16, 2004

(51) Int. Cl.
*G06F 15/177* (2006.01)
*G06F 9/44* (2006.01)

(52) U.S. Cl. ............ 709/221; 709/222; 717/168; 717/171; 717/172; 717/173

(58) Field of Classification Search ............ 455/560; 709/220, 221, 222; 713/168, 169, 170, 171, 713/172, 173
See application file for complete search history.

(56) References Cited

U.S. PATENT DOCUMENTS

| | | | | |
|---|---|---|---|---|
| 5,155,837 | A * | 10/1992 | Liu et al. ............... | 709/221 |
| 5,410,703 | A * | 4/1995 | Nilsson et al. .......... | 717/168 |
| 6,347,396 | B1 * | 2/2002 | Gard et al. ............. | 717/168 |
| 6,385,770 | B1 * | 5/2002 | Sinander ............... | 717/170 |
| 6,463,584 | B1 * | 10/2002 | Gard et al. ............. | 717/171 |
| 6,574,477 | B1 * | 6/2003 | Rathunde ............... | 455/453 |
| 6,615,404 | B1 * | 9/2003 | Garfunkel et al. ....... | 717/173 |
| 6,966,058 | B2 * | 11/2005 | Earl et al. .............. | 717/171 |
| 7,010,295 | B1 * | 3/2006 | Zerlan et al. ........... | 455/424 |
| 7,171,432 | B2 * | 1/2007 | Wildhagen et al. ...... | 707/203 |
| 7,178,144 | B2 * | 2/2007 | Melchione et al. ...... | 717/172 |
| 2002/0083199 | A1 * | 6/2002 | Dingsor et al. .......... | 709/245 |
| 2002/0107962 | A1 * | 8/2002 | Richter et al. .......... | 709/225 |
| 2003/0055926 | A1 * | 3/2003 | Kwok et al. ............ | 709/221 |
| 2003/0101245 | A1 * | 5/2003 | Srinivasan et al. ...... | 709/221 |
| 2003/0125085 | A1 * | 7/2003 | Collins ................. | 455/560 |
| 2003/0177209 | A1 * | 9/2003 | Kwok et al. ............ | 709/221 |
| 2004/0085359 | A1 * | 5/2004 | Steg et al. ............. | 345/771 |
| 2004/0128370 | A1 * | 7/2004 | Kortright .............. | 709/221 |
| 2004/0228310 | A1 * | 11/2004 | Collins ................. | 370/338 |

OTHER PUBLICATIONS

Yu et al. "A Framework for Live Software Upgrade". 2002, IEEE, 1071-9458/02.*
Carson et al. "System and Method for Automatic Configuration and Performance Tuning of a Network Operating System". Jun. 1997, IBM Technical Disclosure Bulletin, vol. 40 No. 06.*
Hicks et al. "Dynamic Software Updating". Jun. 2001, ACM, 1-58113-414-2/01/06.*

* cited by examiner

*Primary Examiner*—David Wiley
*Assistant Examiner*—Daniel Murray

(57) ABSTRACT

A system and method are disclosed for providing an online software upgrade in a switch in a telecommunications system. The switch includes: 1) a main processing unit for executing call process client applications associated with call connections; 2) call application nodes for executing call process server applications; and 3) system management nodes. A configuration management controller associated with a system management node executes an online software upgrade for the software in the switch while the switch is executing the software that is being upgraded. At least one load sharing policy is capable of associating at least one of the call process client applications with at least one of the call process server applications and to throttle new associations involving the call process server applications.

26 Claims, 11 Drawing Sheets

SYSTEM AND METHOD FOR PROVIDING AN ONLINE SOFTWARE UPGRADE IN LOAD SHARING SERVERS

CROSS REFERENCE TO RELATED APPLICATIONS

The present application is related to U.S. patent application Ser. No. 10/439,256, filed May 15, 2003, entitled "System and Method for Providing an Online Software Upgrade". U.S. patent application Ser. No. 10/439,256 is assigned to the assignee of the present application and is hereby incorporated by reference into the present application as if fully set forth herein.

The present application is related to U.S. patent application Ser. No. 10/038,878, filed Dec. 31, 2001, entitled "System and Method for Distributed Call Processing Using Load Sharing Groups" and issued as U.S. Pat. No. 6,947,752 on Sep. 20, 2005. U.S. Pat. No. 6,947,752 is assigned to the assignee of the present application and is hereby incorporated by reference into the present application as if fully set forth herein.

TECHNICAL FIELD OF THE INVENTION

The present invention is directed to telecommunication systems and, more specifically, to a system and method for providing an online software upgrade in load sharing servers.

BACKGROUND OF THE INVENTION

Wireless service providers continually try to create new markets and to expand existing markets for wireless services and equipment. One important way to accomplish this is to improve the performance of wireless network equipment while making the equipment cheaper and more reliable. Doing this allows wireless service providers to reduce infrastructure and operating costs while maintaining or even increasing the capacity of their wireless networks. At the same time, the service providers are attempting to improve the quality of wireless service and increase the quantity of services available to the end user.

The mobile switching center of a wireless network provides connections between a number of wireless network base stations and the public switched telephone network. Calls originated by or terminated at a cell phone or other mobile station are handled in the mobile switching center by a number of call processing client applications. A conventional mobile switching center typically contains a large switching fabric controlled by a main processing unit (MPU) that contains a large number of data processors and associated memories, often in the form of ASIC chips. Each of these MPU processors contains a call process client application for controlling the flow of control signals of a single call. Each call process client application in turn communicates with a call process server application that controls the flow of control signals for a large number of calls.

Thus, when a particular event occurs during a phone call (e.g., the call set-up, the invocation of three-way calling, call disconnection, or the like), control signals associated with the event are relayed from the mobile station to the call process client application in the mobile switching center (MSC). This call processing client application then relays the control signals to the call process server application, which actually performs the call processing service requested by the control signals.

It is important to keep the mobile switching center of a wireless network fully operational at all times. Typically, when a version of software in a mobile switching center must be upgraded, the mobile switching center must be temporarily taken "off line" during the time that the new software upgrade is being installed. This requires the use of a backup or substitute mobile switching center to maintain a full level of call traffic management.

Therefore, there is a need for improved wireless network equipment and services for upgrading software in a mobile switching center of a wireless network. In particular, there is a need for a system and method for providing an online software upgrade to a mobile switching center so that a mobile switching center that receives a software upgrade does not have to be taken off line during the time of the software upgrade.

SUMMARY OF THE INVENTION

This disclosure provides a system and method for providing an online software upgrade in load sharing servers.

According to one advantageous embodiment of the invention, a switch includes: 1) a main processing unit for executing call process client applications associated with call connections; 2) call application nodes for executing call process server applications; and 3) system management nodes. A configuration management controller associated with a system management node executes an online software upgrade for the software in the switch while the switch is executing the software that is being upgraded. At least one load sharing policy is capable of associating at least one of the call process client applications with at least one of the call process server applications and to throttle new associations involving the call process server applications.

This has outlined rather broadly several features of this disclosure so that those skilled in the art may better understand the DETAILED DESCRIPTION that follows. Additional features may be described later in this document. Those skilled in the art should appreciate that they may readily use the concepts and the specific embodiments disclosed as a basis for modifying or designing other structures for carrying out the same purposes of this disclosure. Those skilled in the art should also realize that such equivalent constructions do not depart from the spirit and scope of the invention in its broadest form.

Before undertaking the DETAILED DESCRIPTION below, it may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 9, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged telecommunications network.

In the disclosure that follows, a group services framework for performing various distributed call processing functions is implemented in a mobile switching center of a wireless communication network. This is by way of illustration only and should not be construed so as to limit the scope of the invention. Those skilled in the art will understand that the online software upgrade system and method described below may be implemented in other types of telecommunication devices, including many varieties of switches, routers and the like.

Figure 1:
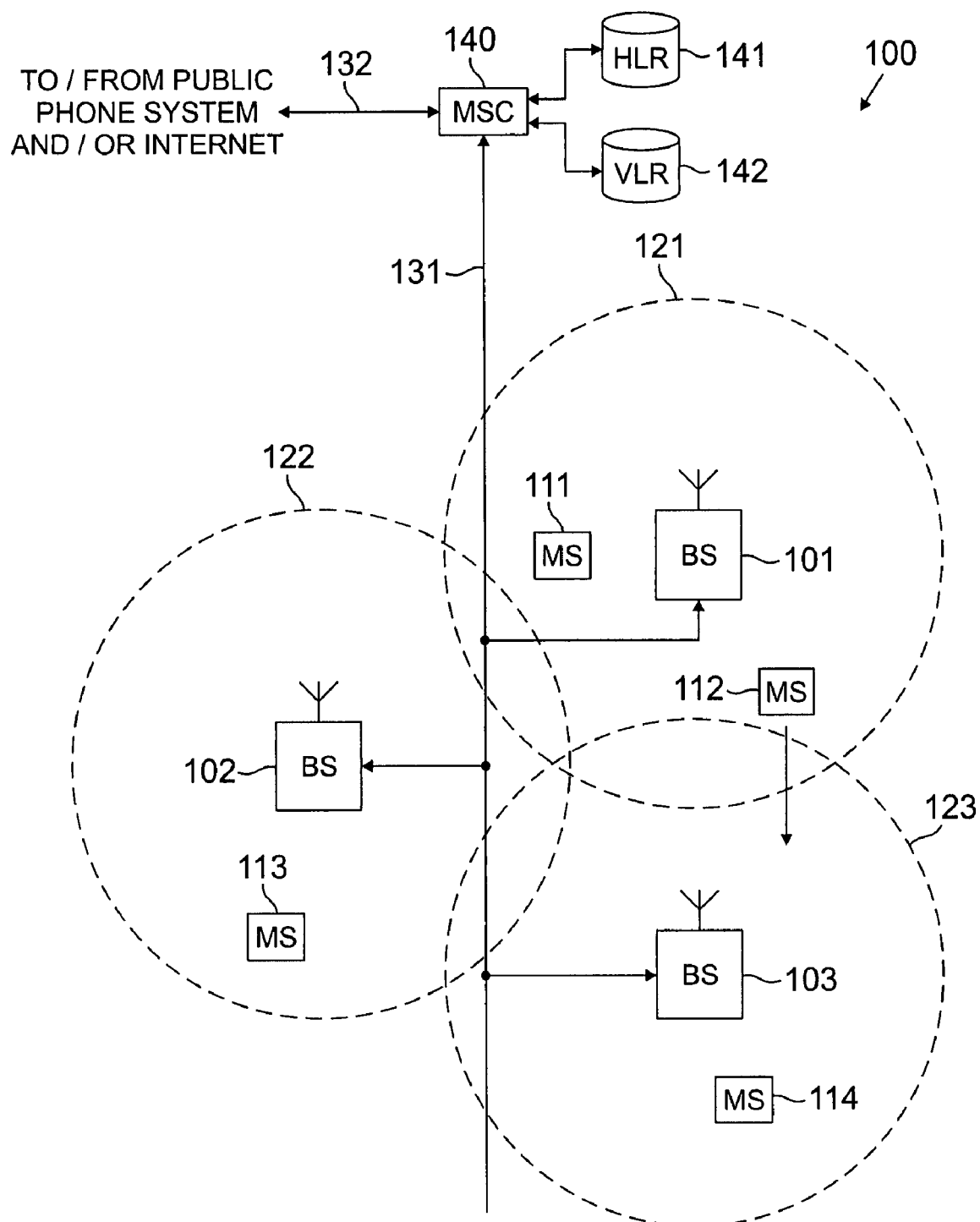
FIG. 1 illustrates an exemplary wireless network according to an advantageous embodiment of the present invention.

FIG. 1 illustrates exemplary wireless network 100 according to one embodiment of the present invention. Wireless network 100 illustrated in FIG. 1 is by way of illustration only and should not be construed so as to limit the scope of the invention. Those skilled in the art will understand that the present invention may be implemented in other types of telecommunication networks.

In the illustrated example, wireless network 100 comprises a plurality of cell sites 121-123. Each cell site 121-123 contains a base station (BS). BS 101 is in cell site 121, BS 102 is in cell site 122, and BS 103 is in cell site 123. Base stations 101-103 communicate with one or more mobile stations (MS) 111-114 over wireless connections (e.g., code division multiple access (CDMA) channels). The mobile stations 111-114 may represent any suitable wireless devices. For example, the mobile stations 111-114 could represent conventional cellular radiotelephones, personal communication services (PCS) handset devices, personal digital assistants (PDAs), portable computers, or metering devices. The present invention is not limited to mobile devices. Other types of access terminals, including fixed wireless terminals, may be used. However, for the sake of simplicity, only mobile stations are shown and discussed hereafter.

The dotted lines shown in FIG. 1 illustrate the approximate boundaries of the cell sites 121-123 in which the base stations 101-103 are located. The cell sites are illustrated as being approximately circular for the purposes of illustration and explanation only. It should be clearly understood that the cell sites may have any other shape or shapes, depending on the cell configuration selected and the presence of natural and man-made obstructions.

As is well known in the art, cell sites 121-123 may comprise a plurality of sectors (not shown), each sector being illuminated by a directional antenna contained in or coupled to a base station 101-103. In the embodiment of the present invention shown in FIG. 1 the base stations 101-103 are located in the center of the cell sites 121-123. Other embodiments may position the base stations 101-103 or directional antennas in any other suitable positions. The present invention is not limited to any one particular configuration of cell sites.

In one embodiment of the present invention, each base station BS 101, BS 102, and BS 103, comprise a base station controller (BSC) and one or more base transceiver stations (BTS). Base station controllers and base transceiver stations are well known to those skilled in the art. A base station controller is a device that manages wireless communications resources, including the base transceiver stations, for specified cells within a wireless communications network. A base transceiver station comprises radio frequency (RF) transceivers, antennas, and other electrical equipment located in each cell site 121-123. This equipment may include air conditioning units, heating units, electrical power supplies, telephone line interfaces, and RF transmitters and RF receivers. For the purpose of simplicity and clarity in explaining the operation of the present invention, the base transceiver stations in each of the cell sites 121-123 and the base station controller associated with the base transceiver stations are collectively represented by the base stations 101-103, respectively.

The base stations 101-103 transfer voice and data signals between each other and the public switched telephone network (PSTN) (not shown) via a communication trunk lines 131, mobile switching center (MSC) 140, and communication trunk lines 132. The base stations 101-103 may also transmit and receive voice and data signals, such as packet data, to and from the Internet or other data network (not shown) via the communication trunk lines 131, mobile switching center (MSC) 140, and communication trunk lines 132. The base stations 101-103 transmit one or more pilot signals that are used by the mobile stations 111-114 to detect and register with the base stations 101-103. In addition, the communication trunk lines 131 provide a connection path to transfer control signals between mobile switching center (MSC) 140 and the base stations 101-103. The control signals may be used to establish connections for voice and data circuits, such as circuits between the MSC 140 and the base stations 101-103 over communication trunk lines 131 and between MSC 140 and the Internet or PSTN over communication trunk lines 132.

The communication trunk lines 131 and 132 may represent any suitable connection, including a T1 line, a T3 line, a fiber optic link, a network packet data backbone connection, or any other type of connection. In one embodiment, the communication trunk lines 131 may link vocoders in the base stations 101-103 with switch elements in the MSC 140. Those skilled in the art will recognize that the connections on communication trunk lines 131 and 132 may provide a transmission path for transmission of analog voice band signals, a digital path for transmission of voice signals in the pulse code modulated (PCM) format, a digital path for transmission of voice signals in an Internet Protocol (IP) format, a digital path for transmission of voice signals in an asynchronous transfer mode (ATM) format, or other suitable connection transmission protocol. Those skilled in the art will recognize that the connections on communication trunk lines 131 and 132 may provide a transmission path for the transmission of analog or digital control signals in a suitable signaling protocol.

The MSC 140 provides services and coordination between subscribers using the mobile stations 111-114 in the wireless network 100 and external networks, such as the PSTN or Internet. In some embodiments, the communication trunk lines 131 may represent several different data links, where each data link couples one of the base stations 101-103 to MSC 140.

The MSC 140 may store information about the mobile stations 111-114 in a home location register (HLR) 141 and in a visitor location register (VLR) 142. In one embodiment, the wireless network 100 may be a "home" network for mobile stations 111-114 that belong to the wireless network 100. Other mobile stations 111-114 that belong to other networks may roam into or visit the wireless network 100. In this embodiment, the HLR 141 stores information about the mobile stations 111-114 that belong to the wireless network 100, and the VLR 142 stores information about the mobile stations 111-114 that are visiting the wireless network 100.

In the illustrated example, the mobile station 111 is located in cell site 121 and is in communication with the base station 101. The mobile station 113 is located in cell site 122 and is in communication with the base station 102. The mobile station 114 is located in cell site 123 and is in communication with the base station 103. The mobile station 112 is located in cell site 121 but is close to and moving in the direction of cell site 123. At some point, as the mobile station 112 moves into cell site 123 and out of cell site 121, a handoff occurs.

handoff procedure transfers control of a call from a first cell site to a second cell site. As the mobile station 112 moves from cell site 121 to cell site 123, the mobile station 112 detects a pilot signal from the base station 103 and sends a pilot strength measurement message to the base station 101. When the strength of the pilot signal transmitted by the base station 103 and received and reported by the mobile station 112 exceeds a threshold, the base station 101 initiates a soft handoff process. For example, the base station 101 may signal the target base station 103 that a handoff is needed as described in TIA/EIA IS-95 or TIA/EIA IS-2000.

The base station 103 and the mobile station 112 may then negotiate the establishment of a communication link in the CDMA channel.

Although FIG. 1 illustrates one example of a wireless network 100, various changes may be made to FIG. 1. For example, the network 100 could include any suitable number of base stations 101-103 and cell sites 121-123. Also, the network 100 could be connected to any suitable external network instead of or in addition to the PSTN and the Internet shown in FIG. 1.

Figure 2:
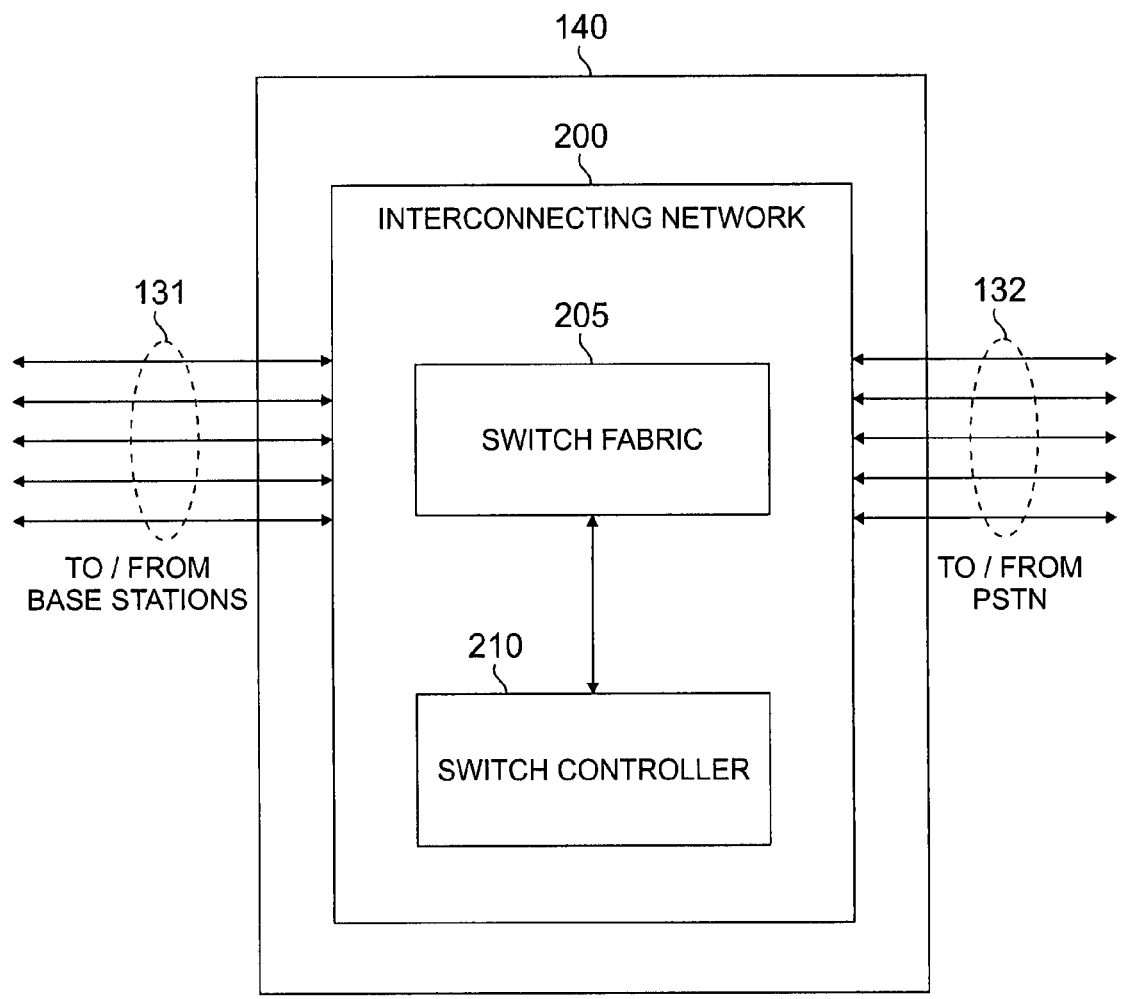
FIG. 2 illustrates an exemplary mobile switching center in greater detail according to an advantageous embodiment of the present invention.

FIG. 2 illustrates exemplary mobile switching center 140 in greater detail according to one embodiment of the present invention. MSC 140 includes interconnecting network 200, among other things. Interconnecting network 200 comprises switch fabric 205 and switch controller 210, which together provide switch paths between communication circuits in communication trunk lines 131 and 132. MSC 140 provides services and coordination between the subscribers in wireless network 100 and external networks, such as the PSTN or the Internet. Mobile switching centers similar to MSC 140 are well known to those skilled in the art.

When a wireless network subscriber turns on his or her mobile station (e.g., cell phone) or fixed access terminal, radio messages over the air interface inform the base station that the mobile station (or fixed access terminal) is joining the network. However, a connection is not automatically made to voice or data traffic carrying circuits in trunk lines 131-132. A voice or data traffic connection to the public switched telephone network (PSTN) or the Internet is not needed until the subscriber places a call (e.g., dials a phone number) or accesses the Internet.

However, even when the phone is idle, certain information about the subscriber (i.e., subscriber data) must be retrieved and stored in either the base station or in MSC 140, or both, in order to authenticate the subscriber, gather billing information, identify the services available to the subscriber, determine capabilities of the mobile station, and the like. The control signals (as opposed to voice and data traffic) required to do this are also carried over communication trunk lines 131 and 132. After the subscriber data is stored in memory in MSC 140, it is available for use by a variety of call processing client (CPC) applications that may be initiated by the subscriber or another device while the mobile station is still active.

For example, when MS 111 is first turned ON, a call process is set up in MSC 140 for MS 111 and subscriber data (e.g., billing information) is stored in MSC 140 that may be accessed by the call process or other call applications that provide particular types of call services. If the subscriber dials a phone number on MS 111 or a call is received from the PSTN directed to MS 111, the call process for MS 111 handles the establishment of a call connection on one of the trunk lines in communication trunk lines 131 and one of the trunk lines in communication trunk lines 132. The MS 111 call process executed in MSC 140 maintains all state information related to the call and to MS 111 and handles all other applications required by MS 111, including three-way calls, voice mail, call disconnection, and the like.

In order to handle a large amount of call traffic, it is necessary to distribute the many active call processes and call service applications handled by MSC 140 across a number of call application nodes (CANs). The call services may include applications for accessing a subscriber database, selecting (or de-selecting) communication trunk lines, retrieving and maintaining call identity information, and the like. The present invention provides an apparatus and method for the online updating of software in MSC 140 while MSC 140 is distributing call processes and call service applications across multiple call application nodes. In one advantageous embodiment MSC 140 comprises a distributed network of redundant servers in which call traffic is distributed in order to increase the call-handling capacity of MSC 140. The redundancy of the distributed servers is transparent to both the call process client applications that require a service and the call process server applications that provide the service. The redundancy of the distributed servers also decreases the complexity of both the client and server applications.

Figure 3:
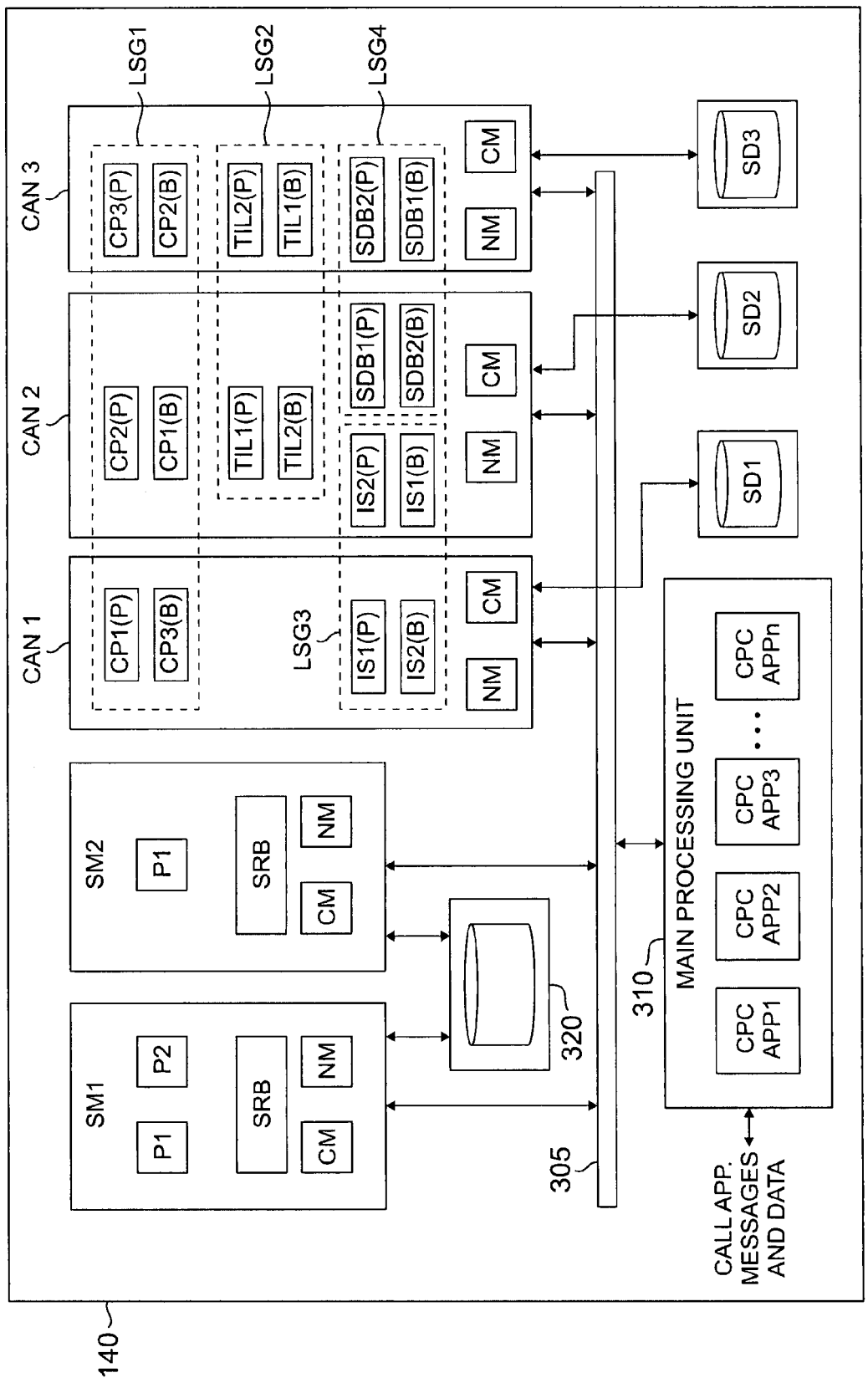
FIG. 3 illustrates selected portions of the mobile switching center shown in FIG. 2 that are capable of performing an online software upgrade for a distributed call processing method using group services according to the principles of the present invention.

FIG. 3 illustrates in greater detail selected portions of exemplary mobile switching center 140 that performs an online software upgrade for a distributed call processing system in accordance with the principles of the present invention. MSC 140 comprises main processing unit (MPU) 310, system manager node 1 (SM1), system manager node 2 (SM2), and master database 320. MSC 140 also comprises a plurality of call application nodes (CANs), including CAN 1, CAN 2, and CAN 3, and a plurality of local storage devices (SDs), namely SD1, SD2, and SD3, that are associated with CAN 1, CAN 2 and CAN 3. The use of three call application nodes (CANs) is shown as an example. Any number N of call application nodes (CANs) may be used. Master database 320 may be used as a master software repository to store databases, software images, server statistics, log-in data, and the like. SD1-SD3 may be used to store local capsules, transient data, and the like. The main processing unit (MPU) 310, and the system manager nodes, SM1 and SM2, and the plurality of call application nodes, CAN 1 to CAN 3, communicate through data bus 305.

In the embodiment shown in FIG. 3, each one of system manager nodes (SM1 and SM2) and each one of the call application nodes (CAN 1 to CAN 3) executes a configuration management (CM) application that sets up each node with the appropriate software and configuration data upon initial start-up or after a reboot. Each node also executes a node monitor (NM) application that loads software and tracks processes to determine if any process has failed. System manager nodes SM1 and SM2 execute a first arbitrary application, P1, and system manager node SM1 also executes a second arbitrary application, P2.

Call application nodes 1 to 3 (CAN 1 to CAN 3) also execute a number of call process (CP) server applications organized as primary and backup processes that are available as distributed group services to 1 to "n" call process client (CPC) applications, namely CPC APP1 to CPC APPn in main processing unit 310. The three (3) call application nodes (e.g., CAN 1-CAN 3) are separate computing nodes comprising a processor and memory that provide scalability and redundancy by the simple addition of more call application nodes.

Each of the "n" call process client (CPC) applications, namely CPC APP1 to CPC APPn in MPU 310, handles the control signals and messages related to a single call associated with a mobile station. Each of CPC APP1 to CPC APPn establishes a session with a load sharing group, which assigns the call to a particular one of the primary-backup group call process server applications, CP1, CP2, or CP3. The selected call process server application actually performs the call process services/functions requested by the call process client application.

In the illustrated embodiment, three exemplary call process server applications are being executed, namely CP1, CP2, and CP3. Each of these processes exists as a primary-backup group. Thus, CP1 exists as a primary process, CP1(P), and a backup process, CP1(B). Similarly, CP2 exists as a primary process, CP2(P), and a backup process, CP2(B), and CP3 exists as a primary process, CP3(P), and a backup process, CP3(B). In the illustrated embodiment, CP1(P) and CP1(B) reside on different call application nodes (i.e., CAN 1 and CAN 2). This is not a strict requirement. CP1(P) and CP1(B) may reside on the same call application node (e.g., CAN 1) and still provide reliability and redundancy for software failures of the primary process, CP1(P). However, it is preferable that the primary process and the backup process reside on different call application nodes, thereby providing hardware redundancy as well as software redundancy. Thus, CP1(P) and CP1(B) reside on CAN 1 and CAN 2, CP2 (P) and CP2(B) reside on CAN 2 and CAN 3, and CP3(P) and CP3(B) reside on CAN 3 and CAN 1.

Together, CP1, CP2 and CP3 form a super group for load sharing purposes. Thus, CP1(P) and CP1(B), CP2(P) and CP2(B), and CP3(P) and CP3(B) are part of a first load sharing group (LSG1), indicated by the dotted line boundary. Additionally, CAN 1-CAN 3 host three other load sharing groups, namely, LSG2, LSG3, and LSG4. LSG2 comprises two trunk idle list (TIL) server applications, namely TIL1 and TIL2. TIL1 exists as a primary process, TIL1(P), on CAN 2 and a backup process, TIL1(B), on CAN 3. TIL2 exists as a primary process, TIL2(P), on CAN 3 and a backup process, TIL2(B), on CAN 2. Similarly, LSG3 comprises two identity server (IS) applications, namely IS1 and IS2. IS1 exists as a primary process, IS1(P), on CAN 1 and a backup process, IS1(B), on CAN 2 and IS2 exists as a primary process, IS2(P), on CAN 2 and a backup process, IS2(B), on CAN 1. Finally, LSG4 comprises two subscriber database (SDB) server applications, namely SDB1 and SDB2. SDB1 exists as a primary process, SDB1(P), on CAN 2 and a backup process, SDB1(B), on CAN 3 and SDB2 exists as a primary process, SDB2(P), on CAN 3 and a backup process, SDB2(B), on CAN 2.

A group service provides a framework for organizing a group of distributed software objects in a computing network. Each software object provides a service. In addition, the group service framework provides enhanced behavior for determining group membership, deciding what actions to take in the presence of faults, and controlling unicast, multicast, and groupcast communications between members and clients for the group. A group utilizes a policy to enhance the behavior of the services provided by the group. Some of these policies include primary-backup for high service availability and load sharing for distributing the loading of services within a network.

Call processing server applications, such as CP1-CP3, IS1-IS2, and TIL1-TIL2, located within a computing network provide services that are invoked by client applications, such as CPC APP1 to CPC APPn. As shown in FIG. 3, the call processing server applications are organized into primary-backup groups configured as a "one plus one" (1+1) type of primary-backup group (i.e., a primary back-up group including one primary and one backup). There are multiple numbers of these primary-backup groups and the exact number is scalable according to the number of processes and/or computing nodes (e.g., CANs) that are used. All of the primary-backup groups are themselves a member of a single load sharing group (e.g., LSG1, LSG2, LSG3, LSG4).

It is important to note that while the call process client applications, CPC APP1 to CPC APPn, are clients with respect to the call process server applications, CP1, CP2, and CP3, a server application may be a client with respect to another server application. In particular, the call process server applications CP1-CP3 may be clients with respect to the trunk idle list server applications, TIL1 and TIL2, the subscriber database server applications, SDB1 and SDB2, and the identity server applications, IS1 and IS2.

A client application establishes an interface to the load sharing group. When a new call indication is received by the client application, the client application establishes a session with the load sharing group according to a client-side load sharing policy. The initial policy is round-robin (i.e., distribution of new calls in sequential order to each CAN), but other policies may be used that take into account the actual loading of the different primary-backup groups.

The client application associates the session with the new call and sends messages associated with the call over the session object. The client application also receives messages from the primary-backup group via the session established with the primary-backup group. Only the primary process (e.g., CP1(P)) of the primary-backup group joins the load sharing group (e.g., LSG1). For a variety of reasons, the server application containing the primary process may be removed from service. The server application may elect to not accept any new calls by leaving the load sharing group. However, the client applications may still maintain their session with the primary-backup group for existing calls. This action is taken because new call traffic may be lost if the primary process also fails. New calls are not distributed to the primary-backup group if it leaves the load sharing group.

If the primary of the primary-backup group that is a member of the load sharing group should fail, the backup member is informed that the primary member has failed (or left) and then assumes the role of primary member. The responsibility for these actions may be performed by the server application. It may be the responsibility of the group service to inform the backup member that the primary member has failed or left.

As part of the online software upgrade process, one or more applications containing primary-backup groups may be removed from service, brought down, and then brought back up using a new version of software code. These groups, if their interface has not changed, join the existing load sharing group. When first started, it is required that the client interface be capable of throttling the call traffic to specific primary-backup groups. The traffic throttling is expressed as a percentage varying from zero percent (0%) (no calls) to one hundred percent (100%) (all calls). All new calls that would have been scheduled according to the scheduling algorithm are handled by this session. The throttling factor is initialized to one hundred percent (100%) for any primary-backup group that joins the load sharing group. During on-line software upgrades, the throttling factor is adjusted to start with the "no calls" case for the new software version. Any client application for the load sharing group may establish a session with a specific primary-backup group. The client may then change the throttling factor at any time. When the throttling factor is changed, all client session interfaces receive via multicast the changed throttling factor. As the throttling factor is increased, the call process server applications with the new software version may receive increasing amounts of call traffic.

In some embodiments, a load sharing group operates using "CPU-based" load sharing. In these embodiments, traffic is allocated to the primary-backup groups in the load sharing group based on the percentage of central processing unit (CPU) resources being consumed by each of the primary-backup groups. As a particular example, a first primary-backup group may be using sixty percent of its CPU resources, while a second primary-backup group may be using twenty percent of its CPU resources. In this example, traffic may be allocated to the second primary-backup group until both groups are using sixty percent of their resources.

In particular embodiments, when no online software upgrade is being performed, two thresholds may be used to throttle the traffic. From zero percent loading to the first threshold, a primary-backup group could receive one hundred percent of the new call traffic it would normally receive under the round-robin algorithm. Between the first threshold and the second threshold, the new call traffic provided to the primary-backup group could decrease linearly from one hundred percent to zero percent. As a result, when the second threshold is met, the primary-backup group would not receive any new call traffic.

When an online software upgrade is being performed, this CPU-based throttling may be overridden so that the new software can be tested. For example, the throttling used during a software upgrade (referred to as "upgrade throttling") could limit the number of new calls handled by the upgraded software to a particular percentage, such as twenty percent of the new call traffic it would normally receive. Once the operation of the new software has been tested and verified, the CPU-based throttling could be used again. In addition, controls could be provided that allow both the CPU-based throttling and the upgrade throttling to be used at the same time. For example, the upgrade throttling could set the maximum percentage of new calls that a primary-backup group can handle. The CPU-based throttling may then reduce that maximum value based on the current resources consumed by the primary-backup group. As a particular example, if the upgrade throttling is twenty percent and the CPU-based throttling is fifty percent, the actual throttling could represent (20%*50%), or ten percent. Additional details of the throttling mechanism are described below.

Call processing communications from the client applications to the call processing server primary-backup groups must support a very high volume of calls. The group software utilizes an internal transport consisting of a multicasting protocol (simple Internet Protocol (IP) multicast) and optionally a unicasting protocol. The unicasting protocol may be TCP/IP, SCTP, or other transport protocol. The multicast protocol is used for internal member communications relating to membership, state changes, and fault detection. In the absence of unicast transport, the multicast protocol is used for client/server communication streams. The unicast protocol, when provided, is used to provide a high-speed stream between clients and servers. The stream is always directed to the primary of a primary-backup group, which is transparent to both the call processing client application and the call process (e.g., CP1, CP2, CP3, TIL1, TIL2, IS1, IS2).

As noted above, the call processes on the call application nodes (CANs) are organized into a load sharing group. Each call process (e.g., CP1, CP2, CP3, TIL1, TIL2, IS1, IS2) is itself a primary-backup group. Both members of the primary-backup group may provide the service but only the primary of the group receives messages and thus actually provides the service. When a member of the group is selected as the primary, it registers one or more interface streams for the group. Each stream is a separate interface for some call processing service.

The call processing client application (e.g., CPC APP1, CPC APP2) in MSC 140 receives a new call indication and uses the group service to select an interface with a call application node (i.e., server) to handle the new call. The call process on each server (i.e., CAN) is a member of a load sharing group and a particular call application node (CAN) is selected using a round-robin algorithm from the perspective of the call process client application. For the particular primary-backup group that is selected a session is returned to the call processing client application. When the session is established with the primary-backup call process server group, the call processing client application then opens an interface to a particular member (representing an interface to a primary-backup group) and obtains a session interface. Each call processing server sends a message related to the new call over the session interface. Any subsequent transactions associated with the call are sent over the same session object.

The call process server (i.e., primary-backup group) may asynchronously send messages over the session using one or more of the defined stream interfaces. The primary member of the call processing server group receives the transactions. The backup group member does not receive transactions. The primary group member sends updates to the backup group member. The primary group member decides when updates are sent to the backup group member. The primary starts sending updates when a call has been answered. Prior to the call being answered, the call is defined as being a transient call. After the call has been answered, the call is defined as being a stable call.

If the primary group member should fail, then the backup group member becomes the new primary member. All transient call information during the fail-over period (the time between when the primary fails and the backup is changed to be the new primary) can be lost. All stable call information must be maintained by the backup. However, some stable call information may be lost if the backup has not received updates.

New call application nodes (CANs) and additional primary-backup group server applications (e.g., CP1, CP2, CP3, TIL1, TIL2, IS1, IS2) may be added dynamically to the load sharing groups and can start servicing new call traffic. Call process client applications are not affected by the additions of new servers. If a server should fail, its backup assumes responsibility for the load. This provides high availability for the servicing of each call and minimizes dropped calls.

Figure 4:
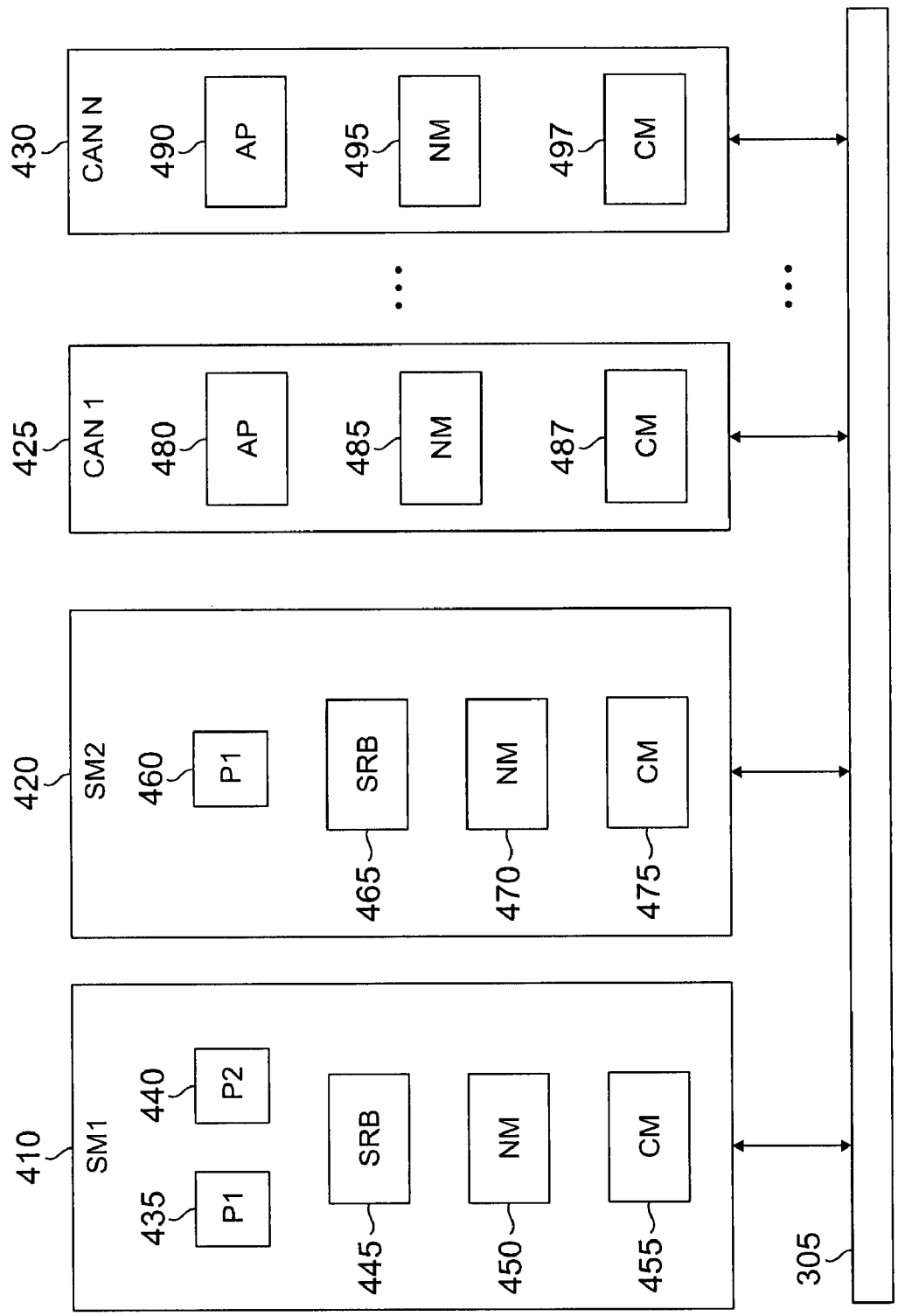
FIG. 4 illustrates in greater detail selected portions of the mobile switching center shown in FIG. 3 according to the principles of the present invention.

FIG. 4 illustrates in more detail selected portions of the mobile switching center (MSC) 140. FIG. 4 illustrates system manager node 1 (SM1) 410, system manager node 2 (SM2) 420, first call application node CAN 1 425, and $N^{th}$ call application node CAN N 430. The ellipsis between CAN 1 425 and CAN N 430 denotes the existence of a plurality of N call application nodes (CAN 1 to CAN N).

As previously mentioned, system manager node 1 (SM1) 410 comprises a first arbitrary application, P1 435, and a second arbitrary application, P2 440. SM1 410 also comprises a Node Monitor (NM) application 450 and Configuration Management (CM) application 455. SM1 410 also comprises a naming service application that is referred to as a System Request Broker (SRB) 445. The operation of SRB 445 will be more fully described below.

Similarly, system manager node 2 (SM2) 420 comprises a first arbitrary application, P1 460, a Node Monitor (NM) application 470 and Configuration Management (CM) application 475. SM2 420 also comprises a System Request Broker (SRB) 465.

Call application node CAN 1 425 comprises software applications 480, Node Monitor (NM) application 485, and Configuration Management (CM) application 487. Call application node CAN N 430 comprises software applications 490, Node Monitor (NM) application 495, and Configuration Management (CM) application 497. Software applications 480 in CAN 1 425 and software applications 490 in CAN N 430 comprise the primary-backup group server applications (CP1, CP2, CP3, TIL1, TIL2, IS1, IS2) previously described with reference to FIG. 3.

In each of the system manager nodes, SM1 and SM2, and in each of the call application nodes (CANs), the Configuration Management (CM) applications comprise a Configuration Management (CM) controller that is capable of executing an online software upgrade for software in the mobile switching center (MSC) 140. As will be more fully described, the Configuration Management (CM) applications upgrade the software while the mobile switching center (MSC) 140 is executing the software to handle call traffic.

In each of the system manager nodes, SM1 and SM2, and in each of the call application nodes, CAN 1 to CAN N, the Node Monitor (NM) application is a generic loader application. The Node Monitor provides an interface that is called the Node Management Interface (NMI). The Node Monitor loads and unloads software applications into a node through the Node Management Interface. The Node Monitor also obtains status information about the software applications through the Node Management Interface. For example, NM 450 is capable of loading or unloading software applications into system manager node SM1 410. NM 450 is also capable of obtaining the status of any software application that has been loaded into system manager node SM1 410.

The Node Monitor in each node is capable of establishing an Event Channel. An Event Channel is a connectionless multicast channel over which all Node Monitor events are reported. The Node Monitor uses the Event Channel to report events such as application loading, application failure, node start events, and node failure events. The Node Monitor monitors all loaded applications and reports when the loaded applications exit or when they fail. Each Node Monitor also monitors all other Node Monitors that may be loaded into other nodes of MSC 140. If there is a failure of a Node Monitor in any node of MSC 140, all of the other Node Monitors will report the node failure.

In each of the system manager nodes, SM1 and SM2, the System Request Broker (SRB) is a naming service application. The SRB application is only loaded into system manager nodes. In the exemplary embodiment shown in FIG. 4, SRB 445 is loaded into SM1 410 and SRB 465 is loaded into SM2 420. The SRB naming service enables each server application to register its service. This feature allows a client to associate a public name with a service definition. Typically the service definition minimally contains the address of the service and how to construct a protocol stack that is provided by that service. Client applications use the service name to locate the service definition.

After the client application has obtained the service definition, a protocol stack with the proper address is constructed for the client application. The client application may then communicate with the server application. Generally both the server application and the client applications use group services. The group services appear in the form of a protocol stack. Servers and clients both only have to know the service name. Server applications also define the service type which defines the type of group that is used along with its associated transport.

An online software upgrade system of the present invention is initialized when a Node Monitor application is started within a system manager (SM) node. First, the Node Monitor loads an SRB application into the system manager (SM) node. Generally two system management nodes (SM1 and SM2) are provided for redundancy. That is, Node Monitor 450 loads SRB 445 into SM1 410 and Node Monitor 470 loads SRB 465 into SM2 420.

Consider SRB 445 within system management node SM1 410. SRB 445 in system management node SM1 410 is the Primary in a Primary/Backup group. The other SRB 465 in system management node SM2 420 is a Backup in the same Primary/Backup group. All applications, including the Node Monitors, use an SRB application to define their services. The SRB application performs address assignments and association with the named service. Clients for those services use the SRB application to locate a named service and receive the address and stack description from the SRB application. The client can then establish a direct interface with the application providing that service.

The service definitions are stored in both the Primary SRB and in the Backup SRB. The Primary SRB sends a backup copy of the service definitions to the Backup SRB. Name Resolution Updates are also stored in the Backup SRB. If the Primary SRB should fail for any reason, then the Backup SRB can take over without loss of any of the service definitions.

The online software upgrade system of the present invention introduces a new software load for the various software components in the system of MSC 140 while the system is still actively running. This is accomplished by partitioning the SRB address space into two partitions. The first partition of the SRB address space is the current partition (referred to as the Reference Partition) and the second partition of the SRB address space is the new partition (referred to as the New Partition).

Figure 5:
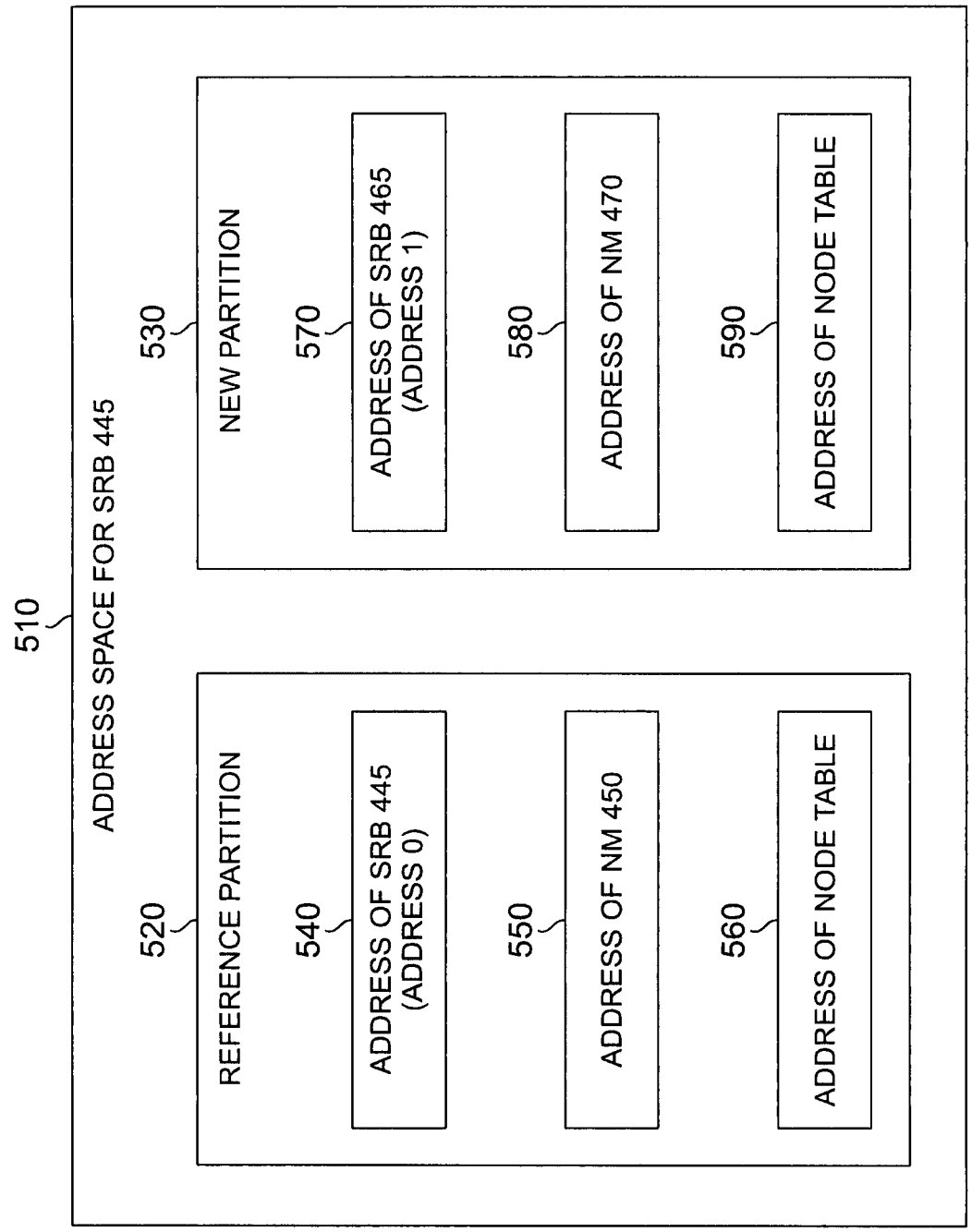
FIG. 5 illustrates an address space for a system request broker (SRB) located within a system management node according to the principles of the present invention.

An exemplary partition of the address space 510 for SRB 445 is shown in FIG. 5. Address space 510 comprises Reference Partition 520 and New Partition 530. Reference Partition 520 comprises an address 540 (also denoted "Address 0") of SRB 445, an address 550 of Node Monitor 450, and an address 560 of a Node Table (described more fully below). New Partition 530 comprises an address 570 (also denoted "Address 1") of SRB 465, an address 580 of Node Monitor 470, and an address 590 of a Node Table (described more fully below).

To perform the online software upgrade of the present invention, Configuration Management (CM) application 455 of system management node SM1 410 partitions SRB address space 510 into Reference Partition 520 and New Partition 530. CM application 455 selects a backup system management node (e.g., SM2 420) and an additional set of other application nodes (e.g., CAN 2 and CAN 3) to take the new software load. CM application 455 then sends signals to cause the Node Monitor in each of the newly selected nodes (e.g., SM2 240, CAN 2 and CAN 3) to shut down the nodes. CM application 455 then sends signals to cause the Node Monitor in each of the newly selected nodes to install the new software. CM application 455 then assigns the New Partition 530 a new SRB address 570 that is different than the SRB address 540 in the Reference Partition 520. CM application 455 then starts the system management node SM2 420 in New Partition 530 with the new SRB address 570.

SRB 445 in the Reference Partition 520 remains as a single member Primary in a Primary/Backup group. SRB 465 in the New Partition 530 becomes a single member Primary in a Primary/Backup group. SRB 445 in the Reference Partition 520 only handles naming service requests for the Reference Partition 520. Similarly, SRB 465 in the New Partition 530 only handles naming service requests for the New Partition 530. There is one exception to this feature that will be discussed more fully below.

The new software in the New Partition 530 is loaded through each Node Monitor located in each New Partition node. CM application 455 then tests the newly loaded software. If the newly loaded software passes the test, each node in the Reference Partition 520 is shut down, the new software is installed in the New Partition 530, the SRB address is changed for the New Partition nodes, and the New Partition nodes are restarted. This process continues until all the nodes have been upgraded with the new software.

If the newly loaded software does not pass the test, each node in the New Partition 530 is shut down, the previous version of the software is then used, the SRB address is changed back to the Reference Partition address, and the Reference Partition nodes are restarted.

Prior art implementations of this approach required that the applications be aware of which partition in which they were located or required that the applications make some other adjustments to the online software upgrade process. The present invention differs from the prior art by making the online software upgrade process transparent to all applications except for the CM, SRB, and NM applications that control the online software upgrade process.

As previously mentioned, a group service provides a framework for organizing a group of distributed software objects in a computing network. Each software object provides a service. In addition, the group service framework provides enhanced behavior for determining group membership, what actions to take in the presence of faults, and controlling unicast, multicast, and groupcast communications between members and clients for the group. A group utilizes a policy to enhance the behavior of the services provided by the group. Some of these policies include Primary/Backup for high service availability and load sharing for distributing the loading of services within a network.

Group service supports the concept of a "super group." A super group is a group whose members are themselves groups. Typically the members of a super group are themselves the Primary member of a Primary/Backup group. One novel and unique feature of the present invention is the use of super groups to provide transparency to applications during the online software upgrade process. The super group itself is permitted to span partition boundaries so that its address is known in both the Reference Partition and the New Partition. The sub-groups which are members of the super group reside in either the Reference Partition or the New partition. The super group is used by applications to locate members for sevices. This permits both external entities (i.e., entities that are external to the online upgrade process) and internal entities to utilize services without interruption during the online software upgrade process.

A description of this process and how the SRB application and NM application cooperate in this process will now be given. The SRB application comprises a data structure called the Node Table that contains the address used by the Reference Partition, the address used by the New Partition, and the list of nodes that are in the New Partition. If a node is not in the New Partition it must be assumed that the node is in the Reference partition. The Configuration Management (CM) application enters the contents of the Node Table during the initialization of the online software upgrade process.

Figure 6:
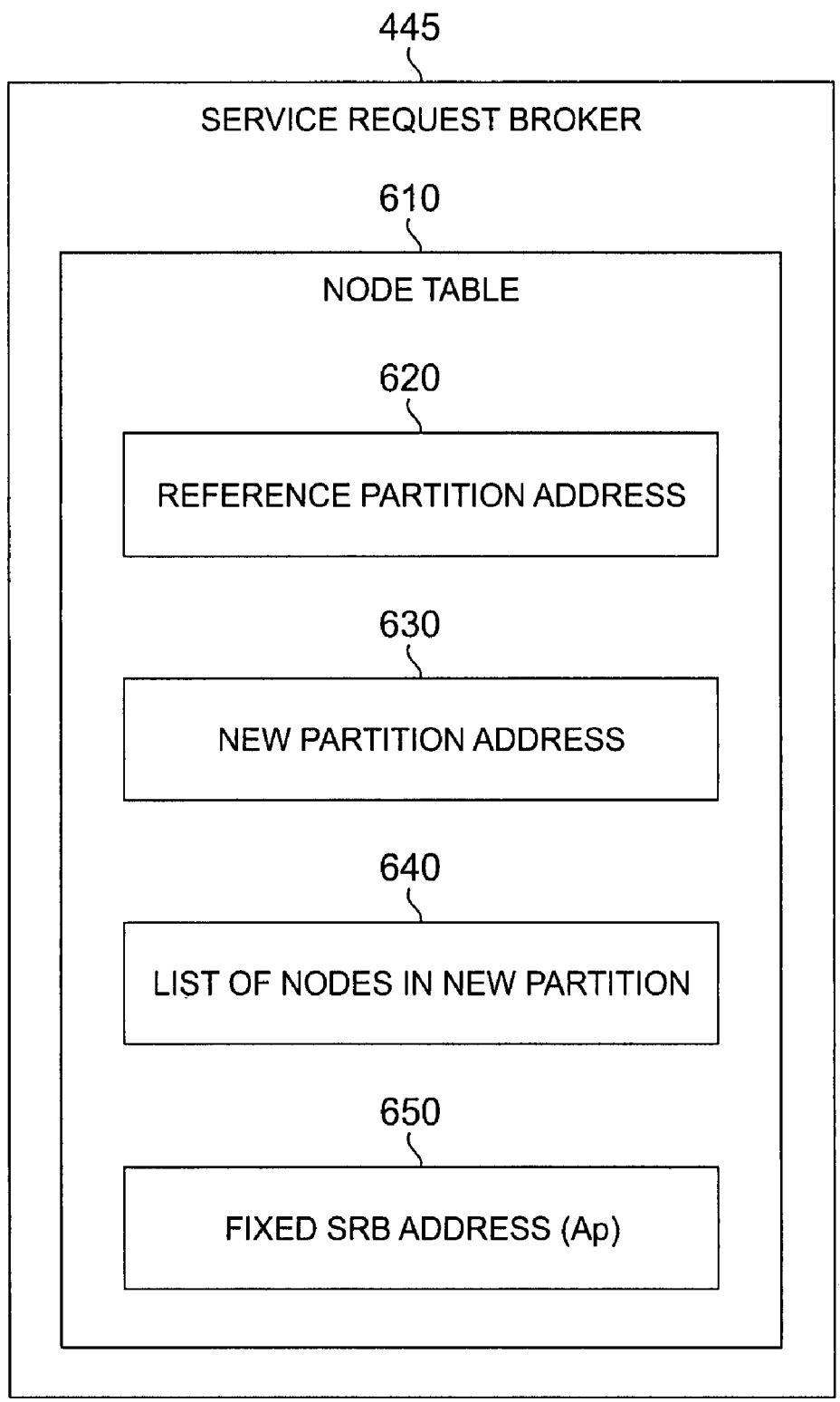
FIG. 6 illustrates a node table within a system request broker (SRB) according to the principles of the present invention.

FIG. 6 illustrates exemplary Node Table 610 located within-Service Request Broker (SRB) 445. Node Table 610 comprises the Reference Partition address 620, New Partition address 630, and a list of nodes that are located within the New Partition 640. Node Table 610 also comprises a fixed SRB address 650 (denoted "Ap"). For convenience in describing the, operation of the present invention, the Reference Partition address 620 may initially be denoted as an "Am" address and the New Partition address 630 may initially be denoted as an "An" address. As will be more fully described, the "Am" address and the "An" address will exchange places during the operation of each cycle of the online software upgrade process.

Assume that at the beginning of the online software upgrade process, the Reference Partition address is denoted as an "Am" address and the New Partition address is denoted as an "An" address. After the first online software upgrade for the system, the Reference Partition address is denoted as an "An" address. After the second online upgrade for the system, the New Partition address is denoted as an "Am" address. The "Am" and "An" addresses exchange places (i.e., cycle) with each new software load.

Each Node Monitor (NM) initially queries the Node Table in the SRB (e.g., Node Table 610 in SRB 445) to determine what address to use. Each Node Monitor initially uses a fixed SRB address "Ap" (e.g. fixed SRB address 650) to communicate with the SRB. The Node Monitor may communicate with any SRB using the fixed SRB address "Ap" regardless of the partition location. The Node Table is accessable (i.e., shared) across both the Reference Partition and the New, Partition.

The Node Monitor, in any node is automatically started with the fixed SRB "Ap" address as an input parameter. The Node Monitor attempts to contact any SRB that is reachable through the fixed SRB "Ap" address. If an SRB cannot be found, then the Node Monitor loads an SRB using the "Ap" address as an input parameter. When the Node Monitor is able to contact an SRB, the Node Monitor requests the address for the node (either the "Am" address or the "An" address) that the Node Monitor and all of its loaded applications should be using. The Node Monitor then loads a local SRB if it has not already done so (using either the "Am" address or the "An" address). When the Node Monitor loads applications into its node, the Node Monitor tells each loaded application what SRB address to use (either the "Am" address or the "An" address based upon the original SRB communication). This is the extent of the actions that are required of the Node Monitor program in support of the online software upgrade process of the present invention.

The SRB (e.g., SRB 445) comprises an SRBServerMain program (referred to as the "SRBServerMain"). The SRBServerMain is started using the following command:

SRBServerMain Ap [Am|An], where [ ] denotes an optional argument and the vertical line | denotes "or". The SRBServerMain program persistent database has a data structure called the System Address Field that contains the following data elements:

Am—IP multicast address m.

An—IP multicast address n.

Partition Address Index—(0 or 1) indicating either an "m" or an "n" address for this partition.

The SRBServerMain creates two group server interfaces (the partition independent interface and the partition interface):

The first interface uses the multicast address "Ap". This address is the partition independent address through which the Node Monitor in each node can obtain its partition address.

The second interface is created using the assigned partition multicast address, either the Am address or the An address.

If SRBServerMain is started with the optional address argument (either the Am address or the An address), then SRBServerMain uses that address for the second interface. SRBServerMain then edits its local SRB System Address Field Partition Address Index to correspond to the input address argument. If the input address does not match one of the addresses in the System Address Field, then SRBServerMain outputs an error to the system log. If there is no local SRB System Address Field, then SRBServerMain outputs an error to the system log. SRBServerMain still establishes its interface using the input address argument.

If the SRBServerMain is not started using the optional address argument, then SRBServerMain reads the local SRB System Address Field and selects the address referenced by the Partition Address Index. If there is no SRB System Address Field, then SRBServerMain outputs an error to the system log and does not establish the second interface.

SRBServerMain normally runs in a duplex mode with one SRB being the Primary in a Primary/Backup group. When the second SRB initializes, it is the responsibility of the Primary SRB to equalize the state of the Primary with that of the Backup. The SRB System Address Field contents for the Backup SRB are equalized with that of the Primary SRB to avoid address inconsistencies.

The SRB defines the Node Table and provides an application programming interface (API) to set and retrieve the Node Table data. As previously mentioned, the Node Table contains: (1) the Reference Partition address (either Am or An); (2) the New Partition Address (either Am or An where the Reference Partition address and the New Partition address are different); and (3) the list of node names in the New Partition.

The Configuration Management (CM) application controls which nodes are in the New Partition when the online software upgrade process is initiated. When a node is selected to migrate to the New Partition, the New Partition node is shut down, the new software is installed in the New Partition node, and the name of the New Partition node is added to the list of nodes in the New Partition. When the New Partition node is started, the Node Monitor will initialize the node as previously described, and will load the new version of software using the New Partition SRB address.

Before the online software upgrade process of the present invention is initiated, an SRB initializes its operation by initializing its Node Table if it is not already set to the values obtained from the local SRB System Address Field. The SRB then sets the Reference Partition Address to the value of the address referenced by the Partition Address Index. The SRB then sets the New Partition Address to the value of the other address. The SRB then sets the list of node names in the New Partition to empty (i.e., no names in the list). If the SRB is selected to operate as a Backup SRB, the Primary SRB updates its SRB System Address Field and the Backup SRB overwrites its local SRB System Address Field with the update value. The Backup SRB also receives the Node Table and updates its local version of the Node Table.

When the online software upgrade process of the present invention is initiated, the backup system manager (e.g., SMs) and a subset of call application nodes (CANs) are shutdown. (For purposes of description, the SM in the Reference Partition is denoted SM1 and the SM in the New Partition is denoted SM2). The Configuration Management (CM) application sets the Node Table within the one instance of SRB running locally. The Configuration Management (CM) application then adds the shutdown nodes to the New Partition list.

The user (i.e., technician) then loads the new version of software onto the shutdown nodes. The Configuration Management (CM) application then starts SM2 in the New Partition. This starts the Node Manager application. The Node Manager attempts to contact any SRB using the Ap address. For example, the Node Manager contacts the SRB in SM1. Assume that the Reference Partition address is an An address and the New Partition address is an Am address. The Node Monitor queries the SRB to find out what address to use for SM2.

In this example, the SRB returns the Am address. The Node Monitor then loads a local SRB and tells the local SRB to use the Ap address and the Am address. All subsequent applications that are loaded by the Node Monitor of SM2 are told to use the Am address. All name associations are defined to this local SRB. The SRB in SM1 is not visible to any applications running in SM2. Even though the applications may define the same named services as in SM1, because the address spaces are different the applications are not accessible between the two partitions.

There is one exception to this general rule. The SRB in the Reference Partition and the SRB in the New Partition share service definitions. They also share the Node Table and any other resources that must be shared across the boundary of the two partitions. This includes super group service definitions which must span both of the partitions.

When an call application node (e.g., CAN 2) is brought up in the New Partition, it starts a local Node Monitor. Assume that call application node 1 (CAN 1) is the Reference Partition. The Node Monitor in the New Partition uses the Ap address to contact an SRB. The SRB will either be the SRB in SM1 or the SRB in SM2. Because the Node Table is the same in both partitions, it does not matter which SRB is used. The Node Monitor then requests the partition address that it should use giving the node name of CAN 2. The SRB returns an Am address which is the address used in the New Partition. All applications then loaded into the New Partition node CAN2 will then use the Am address to define and locate services. Similar actions occur for any additional application nodes that are started in the New Partition.

The user (i.e., technician) then tests the newly loaded software in the New Partition. If the test is successful, then nodes in the Reference Partition may be moved forward by shutting them down, updating the SRB Node Table, loading the new software in the New Partition node, and then restarting the New Partition node. If the test is not successful, then any node may be migrated back to the Reference Partition by first shutting down the New Partition node, removing it from the SRB Node Table, restoring the original software load to the Reference Partition node, and then restarting the Reference Partition node.

During the process of the online software upgrade it is desirable to make the transition as transparent as possible to the majority of applications. For many services the online software upgrade process as previously described is sufficient to provide transparency. Unfortunately, a set of services exists that must be utilized from both partitions. Typically these services include load sharing services that must be accessed by external entities either through a firewall (or through some other means), shared distributed resources, and shared resources handled by centralized servers.

To solve the problem of transparency for services that must be provided across partition boundaries, the super group concept is utilized. The super group definition itself is shared between both partitions. This provides the ability to locate actual servers in either partition on the basis of some selection criteria. This can include load sharing (least loaded, least memory used, etc.), which server has a particular resource that needs to be obtained, and so forth. The actual partition in which the application is located is transparent to the application. This feature enables an application (1) to remain unaware of the partition in which the application is located, and (2) to remain unaware of the partition in which a service the application is using is located.

Figure 7A:
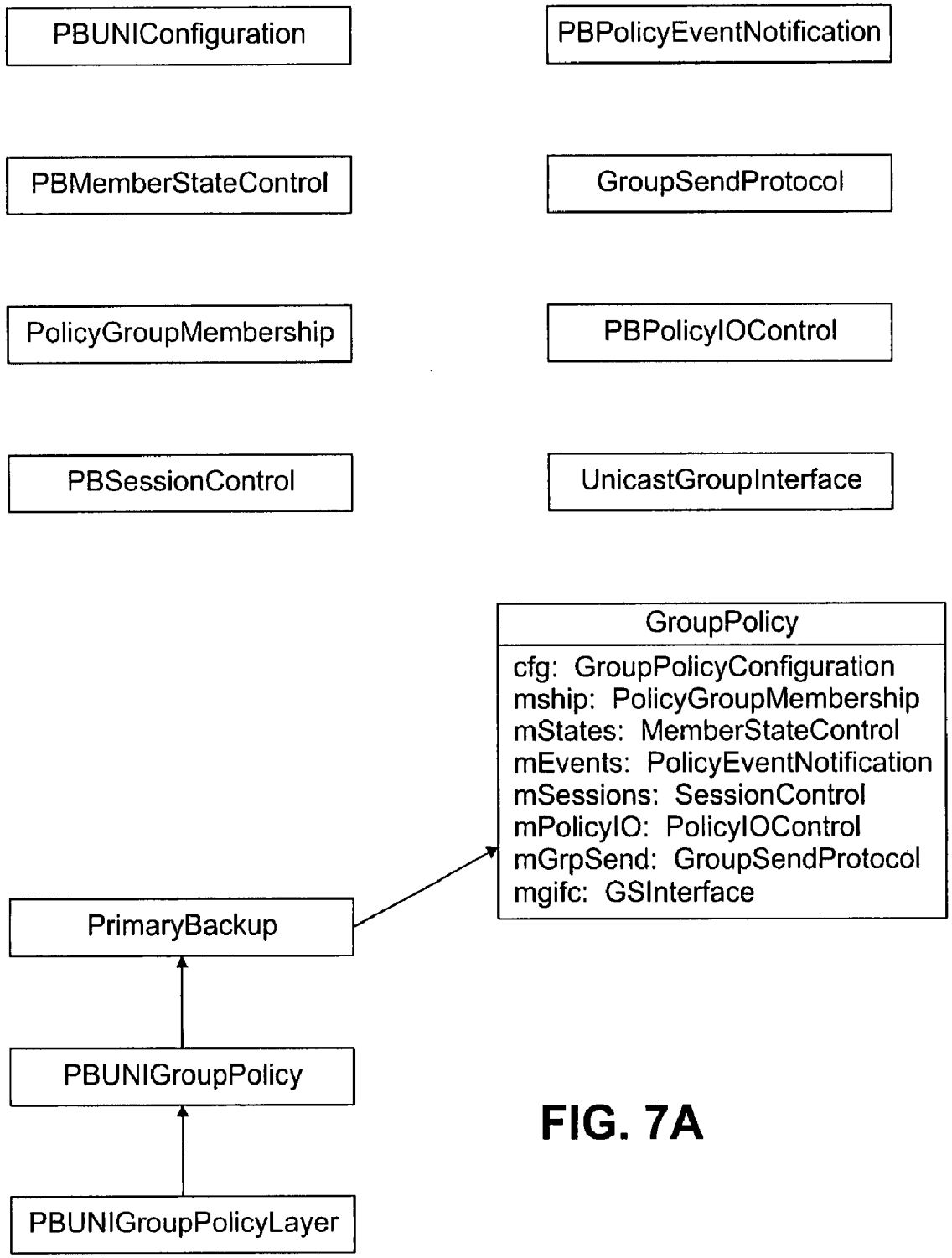
FIGS. 7A through 7C illustrate exemplary policy architectures according to the principles of the present invention.
Figure 7B:
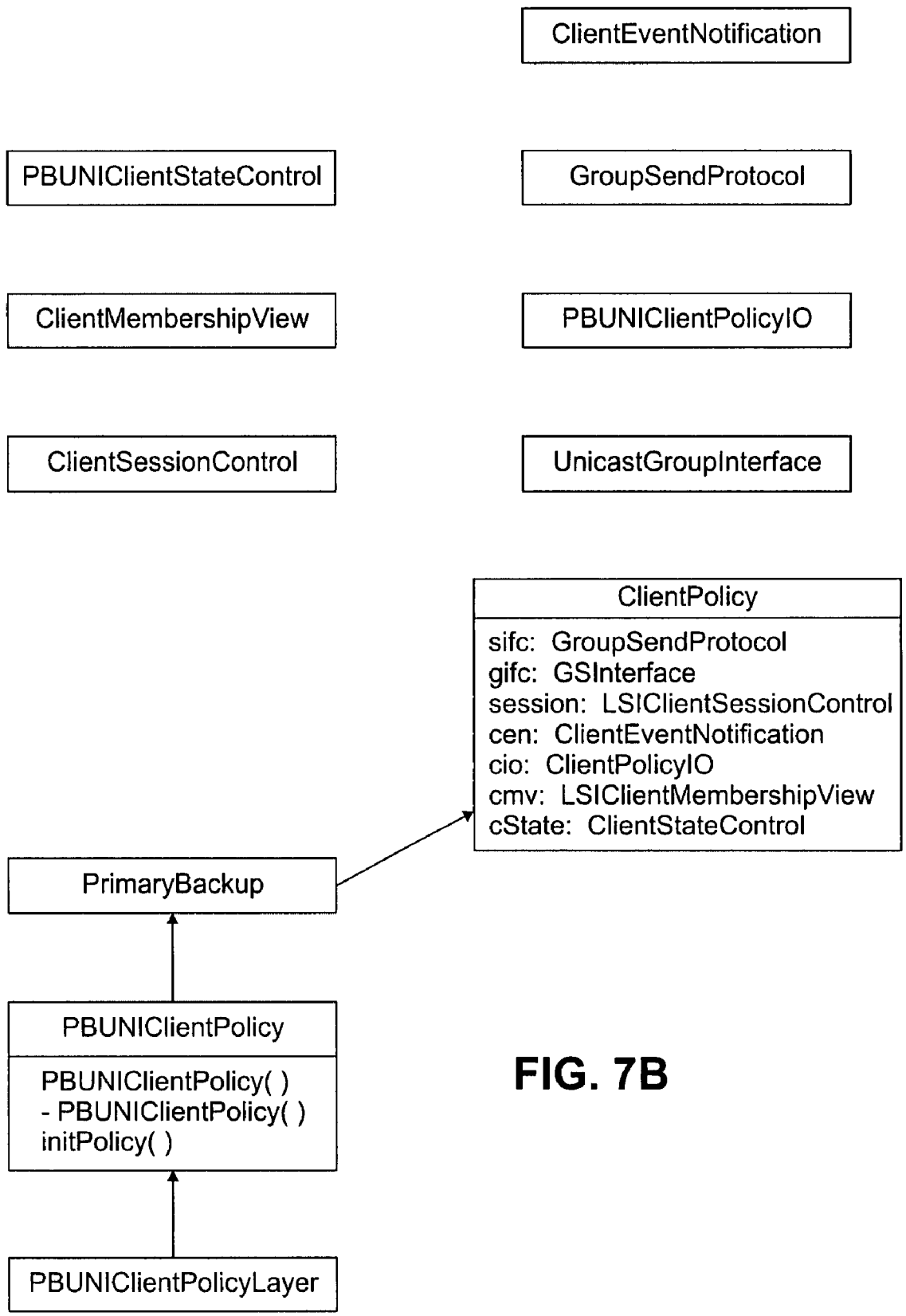
Figure 7C:
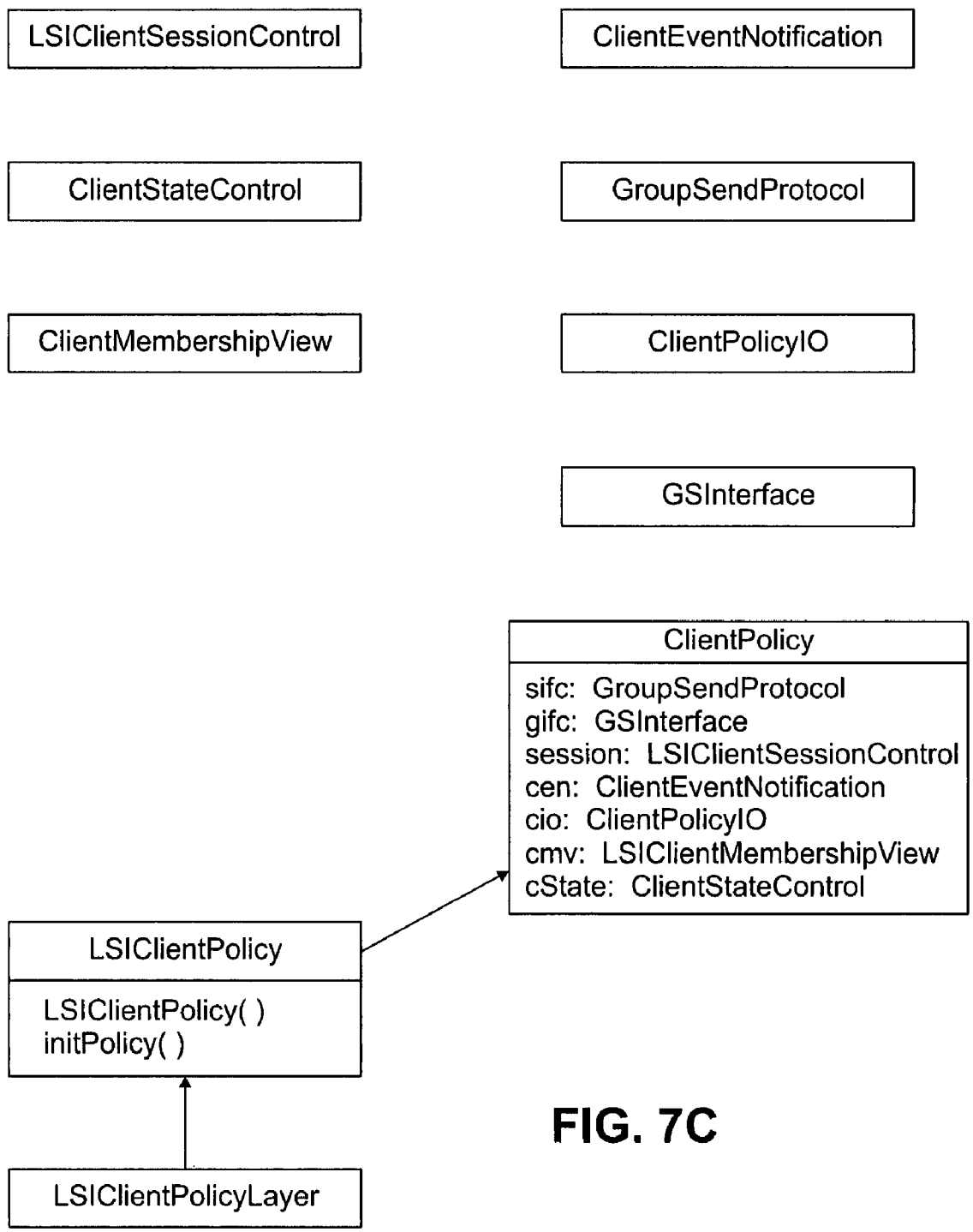

FIGS. 7A through 7C illustrate exemplary policy architectures according to the principles of the present invention. In particular, FIG. 7A is an illustration of server side internal group policy classes according to an exemplary embodiment of the present invention. FIG. 7B is an illustration of a client side internal client policy architecture according to an exemplary embodiment of the present invention. FIG. 7C is an illustration of a load sharing client side policy internal architecture according to an exemplary embodiment of the present invention.

Server applications create a primary-backup group and then join the load sharing group. This action creates the server side policy containing the objects shown in FIG. 7A. The group policy distributes invocations from clients, participates in a distributed election of the primary in the group, maintains group membership, and monitors for group member failures. Server applications join a load sharing group using a group adaptor object as a proxy member of the load sharing group. The group adaptor object is set with the name of the primary-backup group prior to joining the load sharing group.

Client applications establish a client interface to the load sharing group and begin by opening a session. The act of opening a session utilizes a client side load sharing policy to select one of the members of the load sharing group. The internal load sharing client policy architecture is shown in FIG. 7C. The session object itself encapsulates a client side policy that connects to a particular primary-backup group. The internal architecture for this client policy is shown in FIG. 7B.

Call processing client application communicate with the selected server (which is the primary within a primary-backup group). As the primary call process receives messages from the call processing client application, the primary call process sends state updates to the corresponding backup call process. If the primary call process should fail, the backup call process is automatically selected as the new primary. During the fail-over period to the new primary, the call processing client application receives an indication of the failure and may retry the send until the new primary call process is ready to receive messages. This minimizes the lost message traffic during the fail-over period. Once the call processing client application is through with the session, the call processing client application may release the session.

The PBUNIGroupPolicy group policy has the following internal member:

1) PBUNIConfiguration—identifies the group policy name as being "PBUNI" and specifies the QoS requirements for the communication stack for this policy.

2) PolicyGroupMembership—maintains the membership for the group and provides a membership protocol for adding new members, removing members that have left, and marking members that have failed as "FAILED".

3) PBPolicyEventNotification—provides the behavior for event notifications, such as i) when a member joins the group (recovered), ii) leaves the group (left), iii) fails (failed), or iv) has a state change.

4) PBMemberStateControl—has the state machine for primary selection in the presence of joins, exits, and failures of group members. Each local instance of this class decides which member is the primary. It is possible, due to network partitions, that there can be more than one primary at the same time.

5) PBSessionControl—controls the session establishment between call processing client applications for a primary-backup group and the group members.

6) PBPolicyIOControl—provides the primary-backup policy behavior for multicasting and sending to group members.

7) GroupSendProtocol—provides the group member protocol for sending to other members of the group and to clients of the group.

8) UnicastGroupInterface—is a group interface that provides separate interfaces to each capsule in which a group member resides.

PBUNIClientPolicy is a primary-backup client policy in which unicast links are used to communicate with the group. General sending is sent only to the primary member and is not redundantly sent to the backup member(s). The PBUNIClientPolicy has the following members:

1) ClientMembershipView—provides a local view of the group membership but unlike GroupMembershipView, does not participate in the protocol associated with group membership.

2) PBUNIClientPolicyIO—handles I/O over unicast links to the primary member.

3) GroupSendProtocol—provides the Group Member protocol for sending to other members of the group and to clients of the group.

4) ClientSessionControl—manages sessions on the client side with group members.

5) PBUNIClientStateControl—maintains a local view of which member is the primary in a primary-backup group.

6) ClientSessionControl—manages sessions on the client side with group members.

7) UnicastGroupInterface—provides separate interfaces to each capsule in which a group member resides.

LSIClientPolicy is a load sharing policy for group members who are themselves groups. LSIClientPolicy provides client-side round-robin selection of members when a session to a member is opened. Each session provides a group interface to a particular group. LSIClientPolicy also provides support of message throttling to each session. Throttling can vary from 0% (no messages) to 100% (all messages are sent that would normally be selected using round-robin scheduling). LSIClientPolicy overrides what is in the base ClientPolicy. LSIClientPolicy contains the following members:

1) LSIClientNotification—notifies both the ClientPolicy notifier and the local notifier of events.

2) LSIClientSessionControl—returns a session using a round-robin algorithm. The session provided is an interface to another group. LSISessionControl has a running index that is used to select a new session for each open session request. LSISessionControl has a list of known interfaces called "Member Known". Member Known is a map that is indexed by the Member ID and contains a SessionCount object, which contains the actual session and a reference count of the number of users of the session instance. The sessions in known are maintained even though members may leave the group. When members leave the group they are removed from being available but kept in known. This permits clients to continue to use the group interface even though they have left the load sharing group.

3) GroupSendProtocol—provides the Group Member protocol for sending to other members of the group and to clients of the group.

4) GroupInterface—is the interface class to the multicast and/or unicast protocol stack(s) that are utilized by the group interfaces.

5) ClientPolicyIO—is responsible for handling client I/O.

6) ClientStateControl—is used to control the event state of the group and to retrieve the event state of the group.

As described above, the load sharing policy supports the throttling of call traffic to specific primary-backup groups. The load sharing policy could support CPU-based throttling and upgrade throttling. During the online software upgrade process, a load sharing group (as a service) is defined in the SRBs in both the reference partition 520 and the new partition 530. The SRBs can recognize the load sharing group as being a shared resource. In particular embodiments, the load sharing group has a name beginning with a "." character, and the SRBs recognize the load sharing group as being a shared resource using this character. For these shared resources, both SRBs 445, 465 may maintain the same service definition and address in both the reference partition 520 and the new partition 530. As a result, a request for the load sharing group's resources may be met by either of the SRBs 445, 465 transparently to the calling application.

When a member joins the load sharing group, the member uses a group adaptor class to define its interface to the load sharing group. A primary of a primary/backup group constructs a group adaptor class and then sets its primary/backup group name as its member name. A client policy (described more fully below) uses one of the SRBs 445, 465 to locate the interface of the primary/backup group. The application containing the client policy could reside in the same partition or a different partition as the SRB being used. If a request is made to the SRB in the client's partition, it may not be able to locate an interface or locate the wrong group. To correct this problem, the group adaptor adds a prefix to a partition identifier in the primary/backup group name. An escape sequence, such as a sequence of:

'*'<partition_index>.

is provided. When the SRB receives this string, the SRB parses the string and determines the partition index for the request. If the partition index matches the SRB's partition, the SRB handles the request itself. Otherwise, the SRB hands off the request to the SRB in the other partition.

By making the load sharing group accessible in both partitions and using the load sharing group to locate members regardless of partition, applications can use distributed load sharing servers. The applications also need not be aware that the online software upgrade is in progress. In addition, applications may not need to make any code changes in support of this feature.

When members join the load sharing group, the group policy can determine what partition the member is in. Also, if the member is in the New partition 530, the throttling factor for that member within the load sharing group could be initialized to zero. In other words, the member will not receive any new call traffic until the throttling factor is increased during a new load testing procedure. The new load testing procedure tests the newly loaded software, which may include increasing the throttling factor for that member. If the group policy determines that the member is in the Reference partition 520, the throttling factor could be initialized to one hundred percent.

Figure 8:
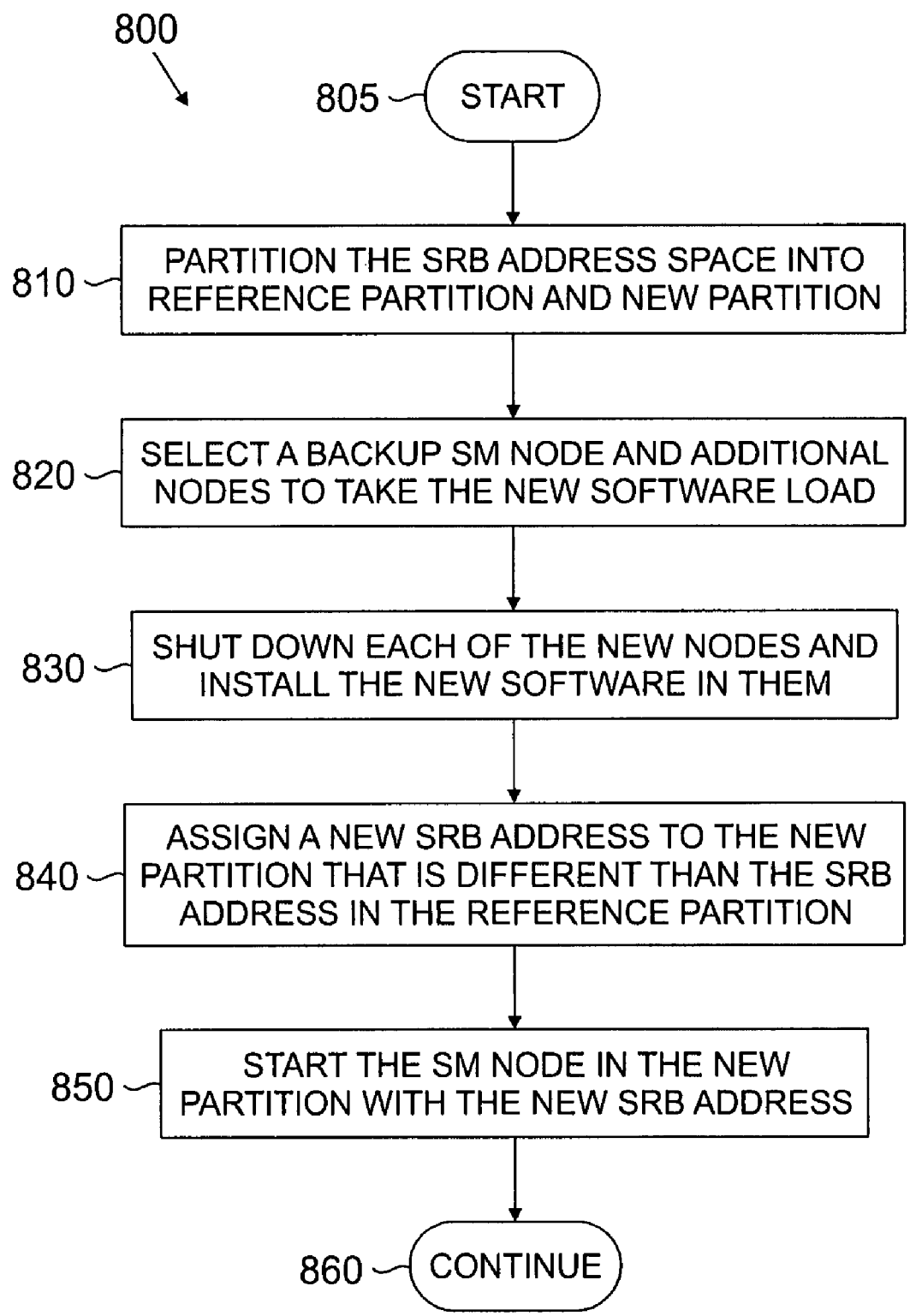
FIG. 8 illustrates a flow chart showing the operation of a first portion of an advantageous embodiment of the method of the present invention.

FIG. 8 illustrates a flow chart showing the operation of a first portion of an advantageous embodiment of the method of the present invention. The steps of the first portion of the method shown in FIG. 8 are generally denoted with reference numeral 800. First, the method begins at some starting point (step 805). Configuration Management (CM) application 455 of system management node SM1 410 partitions the SRB address space 510 into a Reference Partition 520 and a New Partition 530 (step 810). CM application 455 then selects a backup system management node (e.g., SM2 420) and additional nodes (e.g., CAN 2 and CAN 3) to take the new software load (step 820). CM application 455 then sends signals to cause the Node Monitor in each of the newly selected nodes (e.g., SM2, CAN 2 and CAN 3) to shut down each of the nodes and install the new software in them (step 830).

CM application 455 then instigates the assignment of a new SRB address 570 to New Partition 530 that is different than the SRB address 540 in the Reference Partition 520 (step 840). CM application 650 then starts the system management node SM2 420 in the New Partition 530 with the new SRB address 570 (step 850). The method continues at step 860 shown in FIG. 9. Control then passes to step 910 of FIG. 9.

Figure 9:
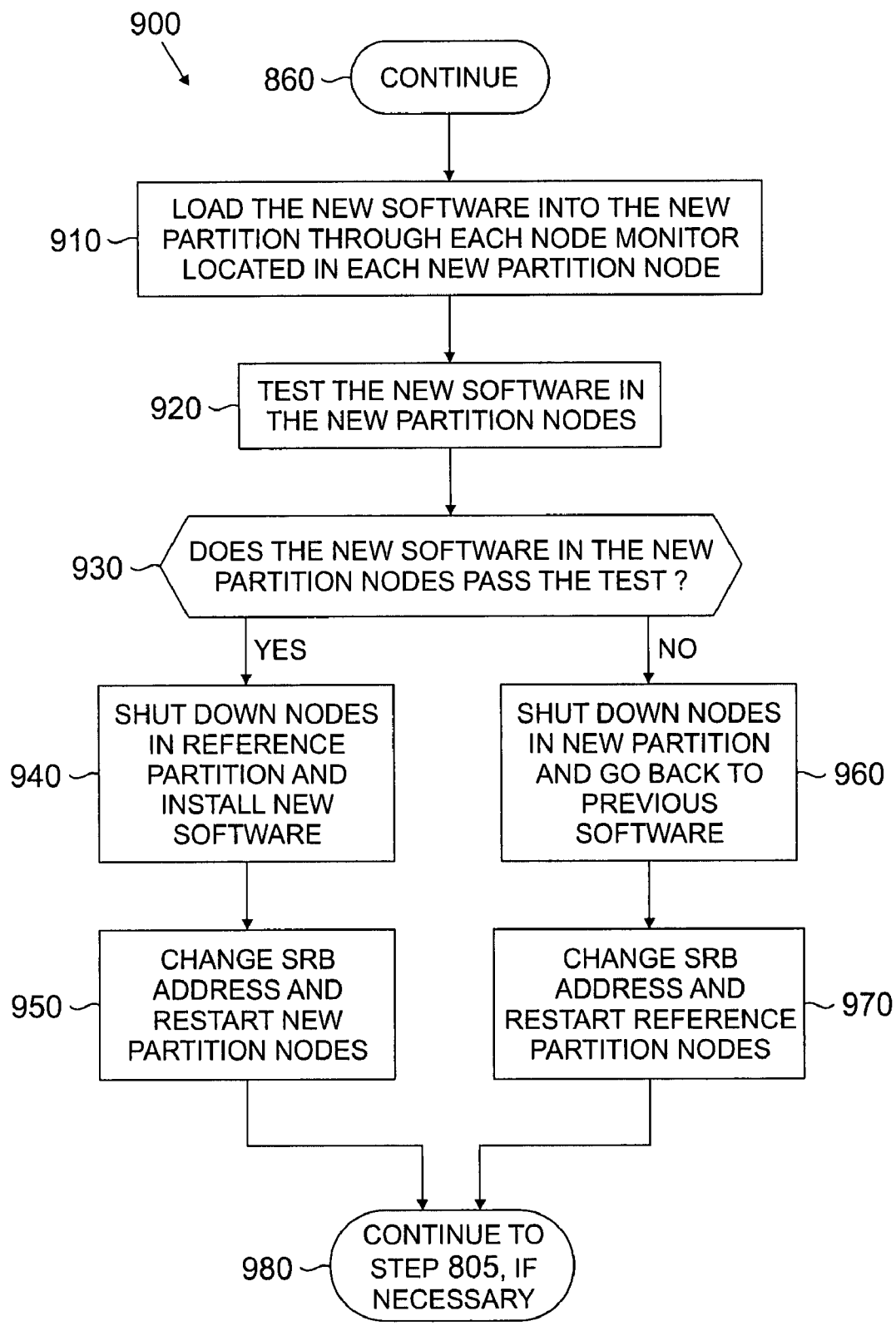
FIG. 9 illustrates a flow chart showing the operation of a second portion of an advantageous embodiment of the method of the present invention.

FIG. 9 illustrates a flow chart showing the operation of a second portion of an advantageous embodiment of the method of the present invention. The steps of the second portion of the method shown in FIG. 9 are generally denoted with reference numeral 900.

Control passes from step 850 of the method as shown in FIG. 8. The new software is then loaded into the New Partition 530 through each Node Monitor located in each New Partition node (step 910). CM application 455 then tests the newly loaded software (step 920). CM application 455 then determines whether the newly loaded software in the New Partition 530 passes the test (decision step 930). If the newly loaded software passes the test, then each node in the Reference Partition 520 is shut down and the software is installed in the New Partition 530 (step 940). The SRB address is then changed for the New Partition nodes, and the New Partition nodes are restarted (step 950). This process continues in step 980 until all the nodes have been upgraded with the new software beginning with step 805 of FIG. 8.

If the newly loaded software does not pass the test, then each node in the New Partition 530 is shut down and the previous version of the software is then used (step 960). The SRB address is changed back to the Reference Partition address and the Reference Partition nodes are restarted (step 970). From step 980, the method could be repeated beginning with step 805 of FIG. 8.

A major advantage of the online software upgrade process of the present invention is that the knowledge about the online upgrade process is restricted to a very small area. The only areas of the mobile switching center (MSC) 140 that have to have knowledge about the online software upgrade process are: (1) the Node Monitor application, (2) the SRB naming service application, (3) group naming modification for super group adaptors in the group service, and (4) the Configuration Management (CM) application that controls the online software upgrade process. The use of super groups handles the problems associated with resources that must be shared across both of the two partitions. The use of super groups also handles problems associated with external interfaces being able to access services during the online upgrade process.

Although the present invention has been described in detail, those skilled in the art should understand that they may make various changes, substitutions and alterations herein without departing from the spirit and scope of the invention in its broadest form.

What is claimed is:

1. A switch capable of handling call connections between calling devices and called devices, the switch comprising:
   a main processing unit capable of executing call process client applications, each of the call process client applications associated with one of the call connections;
   a plurality of call application nodes capable of executing call process server applications;
   a plurality of system management nodes, at least one of the system management nodes associated with a configuration management controller, the configuration management controller capable of executing an online software upgrade for software in the switch while the switch is executing the software to handle the call connections;
   at least one load sharing policy capable of associating at least one of the call process client applications with at least one of the call process server applications and to throttle a number of associations involving the call process server applications; and
   a system request broker capable of enabling each call process server application to register its service within the system management node,
   wherein the configuration management controller is capable of partitioning an address space of the system request broker into a first partition and a second partition and is capable of:
   selecting a backup system management node and at least one new call application node for the second partition;
   assigning a new system request broker address to the second partition that is different than a system request broker address assigned to the first partition;
   starting the backup system management node in the second partition with the new system request broker address; and
   testing the new software after the new software has been loaded into the second partition.

2. The switch as set forth in claim 1, wherein:
   at least two of the call process server applications comprise a load sharing group; and
   the load sharing group is accessible from both of the partitions.

3. The switch as set forth in claim 2, wherein the system request broker in each of the system management nodes is capable of maintaining a common service definition and a common address for the load sharing group in each of the partitions.

4. The switch as set forth in claim 2, wherein:
   the system request broker in each of the system management nodes is associated with one of the partitions; and
   the system request broker in one of the system management nodes is capable of:
   receiving a request from at least one of the call process client applications;
   extracting a partition identifier from the request;
   determining whether the extracted partition identifier identifies the partition associated with the system request broker;
   handling the request if the extracted partition identifier identifies the partition associated with the system request broker; and
   communicating the request to the system request broker in the other system management node if the extracted partition identifier does not identify the partition associated with the system request broker.

5. The switch as set forth in claim 2, wherein the at least one load sharing policy specifies that:
a throttling factor associated with one of the call process server applications is initialized to one hundred percent when the call process server application joins the load sharing group in the first partition; and
the throttling factor is initialized to zero percent when the call process server application joins the load sharing group in the second partition, wherein the throttling factor is increased from zero percent during a test of the call process server application.

6. The switch as set forth in claim 1, wherein the at least one load sharing policy associates one of the call process client applications with one of the call process server applications using a round-robin algorithm, the round-robin algorithm selecting one of the call application nodes.

7. The switch as set forth in claim 1, wherein the at least one load sharing policy comprises:
one or more CPU-based throttling factors used when the online software upgrade is not occurring; and
one or more upgrade throttling factors used when the online software upgrade is occurring.

8. The switch as set forth in claim 7, wherein the one or more CPU-based throttling factors and the one or more upgrade throttling factors are both used when the online software upgrade is occurring.

9. The switch as set forth in claim 1, wherein:
at least two of the call process server applications comprise a load sharing group; and
the load sharing policy is encapsulated in a session object that is capable of connecting to the load sharing group, the session object capable of transporting messages between one of the call process client applications and one of the call process server applications in the load sharing group.

10. The switch as set forth in claim 1, wherein
in response to determining that the new software passes the test, shutting down each node in the first partition, installing the new software in the second partition, changing the system request broker address to the second partition, and restarting the nodes in the second partition; and
in response to determining that the new software fails the test, shutting down each node in the second partition, using a previous version of the software in the first partition, changing the system request broker address to the first partition, and restarting the nodes in the first partition.

11. A wireless network, comprising:
a plurality of base stations capable of communicating with a plurality of mobile stations; and
a mobile switching center coupled to the plurality of base stations, the mobile switching center capable of handling call connections involving at least one of the mobile stations, the mobile switching center comprising:
a main processing unit capable of executing call process client applications, each of the call process client applications associated with one of the call connections;
a plurality of call application nodes capable of executing call process saver applications;
a plurality of system management nodes, at least one of the system management nodes associated with a configuration management controller, the configuration management controller capable of executing an online software upgrade for software in the mobile switching center while the mobile switching center is executing the software to handle the call connections; and
at least one load sharing policy capable of associating at least one of the call process client applications with at least one of the call process server applications and to throttle a number of associations involving the call process server applications,
wherein each of the system management nodes further comprises a system request broker capable of enabling each call process server application to register its service within the system management node, and
wherein the configuration management controller is capable of:
partitioning an address space of the system request broker into a first partition and a second partition;
selecting a backup system management node and at least one new call application node for the second partition;
assigning a new system request broker address to the second partition that is different than a system request broker address assigned to the first partition;
starting the backup system management node in the second partition with the new system request broker address; and
testing the new software after the new software has been loaded into the second partition.

12. The wireless network as set forth in claim 11, wherein:
at least two of the call process server applications comprise a load sharing group; and
the load sharing group is accessible from both of the partitions.

13. The wireless network as set forth in claim 12, wherein:
the system request broker in each of the system management nodes is capable of maintaining a common service definition and a common address for the load sharing group in each of the partitions;
the system request broker in each of the system management nodes is associated with one of the partitions; and
the system request broker in one of the system management nodes is capable of:
receiving a request from at least one of the call process client applications;
extracting a partition identifier from the request;
determining whether the extracted partition identifier identifies the partition associated with the system request broker;
handling the request if the extracted partition identifier identifies the partition associated with the system request broker; and
communicating the request to the system request broker in the other system management node if the extracted partition identifier does not identify the partition associated with the system request broker.

14. The wireless network as set forth in claim 12, wherein the at least one load sharing policy comprises:
a round-robin algorithm that associates one of the call process client applications with one of the call process server applications by selecting one of the call application nodes;
a throttling factor associated with one of the call process server applications that is initialized to one hundred percent when to call process server application joins the load sharing group in the first partition; and
the throttling factor that is initialized to zero percent when the call process server application joins the load sharing group in the second partition, wherein the throttling factor is increased from zero percent during a test of the call process server application.

15. The wireless network as set forth in claim 11, wherein the at least one load sharing policy comprises:
one or more CPU-based throttling factors used when the online software upgrade is not occurring; and
one or more upgrade throttling factors used when the online software upgrade is occurring.

16. The wireless network as set forth in claim 15, wherein the one or more CPU-based throttling factors and the one or more upgrade throttling factors are both used when the online software upgrade is occurring.

17. The wireless network as set forth in claim 11, wherein:
at least two of the call process server applications comprise a load sharing group; and
the load sharing policy is encapsulated in a session object that is capable of connecting to the load sharing group, the session object capable of transporting messages between one of the call process client applications and one of the call process server applications in the load sharing group.

18. The wireless network as set forth in claim 12, wherein in response to determining that the new software passes the test, shutting down each node in the first partition, installing the new software in the second partition, changing the system request broker address to the second partition, and restarting the nodes in the second partition; and
in response to determining that the new software fails the test, shutting down each node in the second partition, using a previous version of the software in the first partition, changing the system request broker address to the first partition, and restarting the nodes in the first partition.

19. For use in a switch that is capable of handling call connections between calling devices and called devices, the switch comprising:
a main processing unit capable of executing call process client applications, each of the call process client applications associated with one of the call connections;
a plurality of call application nodes capable of executing call process server applications;
a plurality of system management nodes; and
a circuit capable of:
executing in a configuration management controller an online software upgrade for software in the switch while the switch is executing the software to handle the call connections, the configuration management controller associated with at least one of the plurality of system management nodes;
enforcing at least one load sharing policy capable of associating at least one of the call process client applications with at least one of the call process server applications and to throttle a number of associations involving the call process server applications;
enabling each call process server application to register its service within one of the system management nodes using a system request broker in each of the system management nodes; and
partitioning an address space of the system request broker into a first partition and a second partition, wherein the circuit is capable of executing the online software upgrade in the configuration management controller by:

selecting a backup system management node and at least one new call application node for the second partition;
assigning a new system request broker address to the second partition that is different than a system request broker address assigned to the first partition;
starting the backup system management node in the second partition with the new system request broker address; and
testing the new software after the new software has been loaded into the second partition.

20. The method as set forth in claim 19, wherein:
at least two of the call process server applications comprise a load sharing group; and
the load sharing group is accessible from both of the partitions.

21. The method as set forth in claim 20, further comprising:
maintaining, in the system request broker in each of the system management nodes, a common service definition and a common address for the load sharing group in each of the partitions, the system request broker in each of the system management nodes associated with one of the partitions;
receiving a request from at least one of the call process client applications at the system request broker in one of the system management nodes;
extracting a partition identifier from the request;
determining whether the extracted partition identifier identifies the partition associated with the system request broker;
handling the request if the extracted partition identifier identifies the partition associated with the system request broker; and
communicating the request to the system request broker in the other system management node if the extracted partition identifier does not identify the partition associated with the system request broker.

22. The method as set forth in claim 20, wherein the at least one load sharing policy comprises:
a round-robin algorithm that associates one of the call process client applications with one of the call process server applications by selecting one of the call application nodes;
a throttling factor associated with one of the call process server applications that is initialized to one hundred percent when the call process server application joins the load sharing group in the first partition; and
the throttling factor that is initialized to zero percent when the call process server application joins the load sharing group in the second partition, wherein the throttling factor is increased from zero percent during a test of the call process server application.

23. The method as set forth in claim 19, wherein the at least one load sharing policy comprises:
one or more CPU-based throttling factors used when the online software upgrade is not occurring; and
one or more upgrade throttling factors used when the online software upgrade is occurring.

24. The method as set forth in claim 23, wherein the one or more CPU-based throttling factors and the one or more upgrade throwing factors are both used when the online software upgrade is occurring.

25. The method as set forth in claim 19, wherein at least two of the call process server applications comprise a load sharing group; and further comprising encapsulating the load sharing policy in a session object that is capable of connecting to the load sharing group, the session object capable of transporting messages between one of the call process client applications and one of the call process server applications in the load sharing group.

26. The method as set forth in claim 20, wherein in response to determining that the new software passes the test, shutting down each node in the first partition, installing the new software in the second partition, changing the system request broker address to the second partition, and restarting the nodes in the second partition; and in response to determining that the new software fails the test, shutting down each node in the second partition, using a previous version of the software in the first partition, changing the system request broker address to the first partition, and restarting the nodes in the first partition.

* * * * *

UNITED STATES PATENT AND TRADEMARK OFFICE
CERTIFICATE OF CORRECTION

| | | |
|---|---|---|
| PATENT NO. | : 7,356,577 B2 | Page 1 of 1 |
| APPLICATION NO. | : 10/459748 | |
| DATED | : April 8, 2008 | |
| INVENTOR(S) | : David Allen Collins | |

It is certified that error appears in the above-identified patent and that said Letters Patent is hereby corrected as shown below:

Column 24, claim 14, line 64, delete "to" and replace with -- the --

Column 26, claim 24, line 63, delete "throwing" and replace with -- throttling --

Signed and Sealed this

Eighth Day of December, 2009

David J. Kappos
*Director of the United States Patent and Trademark Office*